United States Patent
Lin

(10) Patent No.: US 10,921,805 B2
(45) Date of Patent: Feb. 16, 2021

(54) VEHICLE CONTROL METHOD, APPARATUS, AND SYSTEM

(71) Applicant: Huawei Technologies Co., Ltd., Shenzhen (CN)

(72) Inventor: Yangbo Lin, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 210 days.

(21) Appl. No.: 16/138,349

(22) Filed: Sep. 21, 2018

(65) Prior Publication Data

US 2019/0025826 A1    Jan. 24, 2019

Related U.S. Application Data

(63) Continuation of application No. PCT/CN2016/076988, filed on Mar. 22, 2016.

(51) Int. Cl.
*G05D 1/00* (2006.01)
*H04L 29/08* (2006.01)
(Continued)

(52) U.S. Cl.
CPC ......... *G05D 1/0061* (2013.01); *B60W 30/162* (2013.01); *B60W 50/085* (2013.01); *B60W 50/14* (2013.01); *G05D 1/0088* (2013.01); *H04L 67/125* (2013.01); *H04W 4/44* (2018.02); *B60W 2540/215* (2020.02); *B60W 2554/801* (2020.02);
(Continued)

(58) Field of Classification Search
CPC ..... G05D 1/0061; G05D 1/0088; H04W 4/44; B60W 30/162; B60W 50/085; B60W 50/14; H04L 67/125
See application file for complete search history.

(56) References Cited

U.S. PATENT DOCUMENTS

2001/0034575 A1    10/2001    Takenaga et al.
2010/0019891 A1    1/2010    Mudalige
(Continued)

FOREIGN PATENT DOCUMENTS

CN    101823486 A    9/2010
CN    103079917 A    5/2013
(Continued)

OTHER PUBLICATIONS

Machine Translation and Abstract of Chinese Publication No. CN101823486, Sep. 8, 2010, 7 pages.
(Continued)

*Primary Examiner* — Hussein Elchanti
(74) *Attorney, Agent, or Firm* — Conley Rose. P.C.

(57) ABSTRACT

A vehicle control method and a vehicle control apparatus to improve vehicle control flexibility, where the method includes obtaining, using a management device, a first drive mode set, where the first drive mode set includes a drive mode that a first vehicle is currently allowed to use, determining, using the management device, a target drive mode in the first drive mode set, sending, using the management device, indication information to a first vehicle control device, where the indication information includes information about the target drive mode, and the indication information is used to instruct the first vehicle control device to control the first vehicle to use the target drive mode for driving.

20 Claims, 9 Drawing Sheets

(51) Int. Cl.
*H04W 4/44* (2018.01)
*B60W 30/16* (2020.01)
*B60W 50/08* (2020.01)
*B60W 50/14* (2020.01)

(52) U.S. Cl.
CPC ..... *B60W 2556/45* (2020.02); *B60W 2754/30* (2020.02); *G05D 2201/0213* (2013.01); *H04L 67/12* (2013.01)

(56) References Cited

U.S. PATENT DOCUMENTS

| | | |
|---|---|---|
| 2013/0144465 A1 | 6/2013 | Shida |
| 2013/0304513 A1* | 11/2013 | Hyde ................. G06Q 40/08 705/4 |
| 2014/0088814 A1 | 3/2014 | You et al. |
| 2014/0156134 A1 | 6/2014 | Cullinane et al. |
| 2014/0165159 A1 | 6/2014 | Baade et al. |
| 2014/0210608 A1* | 7/2014 | Yamada ................. B60K 37/06 340/459 |
| 2014/0309833 A1 | 10/2014 | Ferguson et al. |
| 2014/0350789 A1 | 11/2014 | Anker et al. |
| 2014/0358353 A1 | 12/2014 | Ibanez-Guzman et al. |
| 2015/0307099 A1 | 10/2015 | Dextreit et al. |
| 2016/0001720 A1 | 1/2016 | Vadgama et al. |
| 2016/0334805 A1 | 11/2016 | Rothoff et al. |
| 2016/0339916 A1* | 11/2016 | Norton .................. B60W 30/16 |
| 2017/0276492 A1* | 9/2017 | Ramasamy ...... G08G 1/096758 |
| 2017/0303842 A1* | 10/2017 | Yoshida .................. A61B 5/18 |
| 2018/0113454 A1* | 4/2018 | Emura .................. B60W 10/18 |
| 2018/0314252 A1* | 11/2018 | Asakura ............. G01C 21/3691 |
| 2018/0329414 A1* | 11/2018 | Igarashi .................. G08G 1/16 |
| 2018/0356818 A1* | 12/2018 | Arai ...................... B60W 50/14 |
| 2019/0025825 A1* | 1/2019 | Takahama ............. B60W 30/16 |
| 2019/0291746 A1 | 9/2019 | Cullinane et al. |

FOREIGN PATENT DOCUMENTS

| | | |
|---|---|---|
| CN | 103661364 A | 3/2014 |
| CN | 104637299 A | 5/2015 |
| CN | 104700612 A | 6/2015 |
| CN | 104900083 A | 9/2015 |
| JP | 2001236600 A | 8/2001 |
| JP | 2007168788 A | 7/2007 |
| JP | 2012038258 A | 2/2012 |
| JP | 2015133050 A | 7/2015 |
| JP | 2016504232 A | 2/2016 |
| WO | 2009066143 A2 | 5/2009 |

OTHER PUBLICATIONS

Machine Translation and Abstract of Chinese Publication No. CN104900083, Sep. 9, 2015, 15 pages.
Foreign Communication From a Counterpart Application, PCT Application No. PCT/CN2016/076988, English Translation of International Search Report dated Dec. 21, 2016, 2 pages.
Foreign Communication From a Counterpart Application, PCT Application No. PCT/CN2016/076988, English Translation of Written Opinion dated Dec. 21, 2016, 6 pages.
Foreign Communication From a Counterpart Application, European Application No. 16894853.7, Extended European Search Report dated Jul. 1, 2019, 11 pages.
Machine Translation and Abstract of Chinese Publication No. CN104637299, May 20, 2015, 9 pages.
Machine Translation and Abstract of Japanese Publication No. JP2007168788, Jul. 5, 2007, 28 pages.
Machine Translation and Abstract of Japanese Publication No. JP2015133050, Jul. 23, 2015, 56 pages.
Foreign Communication From a Counterpart Application, Japanese Application No. 2018-549304, Japanese Office Action dated Oct. 8, 2019, 2 pages.
Foreign Communication From a Counterpart Application, Japanese Application No. 2018-549304, English Translation of Japanese Office Action dated Oct. 8, 2019, 4 pages.

* cited by examiner

VEHICLE CONTROL METHOD, APPARATUS, AND SYSTEM

CROSS-REFERENCE TO RELATED APPLICATIONS

This application is a continuation of International Patent Application No. PCT/CN2016/076988 filed on Mar. 22, 2016, the disclosure of which is hereby incorporated by reference in its entirety.

TECHNICAL FIELD

The present disclosure relates to the field of intelligent transportation technologies, and in particular, to a vehicle control method, apparatus, and system.

BACKGROUND

With development of intelligent transportation technologies, an intelligent transportation system (ITS) has been widely applied. As a comprehensive transportation management system that integrates advanced technologies of information, communications, sensing, control, computer, and the like, the ITS can reduce traffic load, reduce environmental pollution, ensure traffic safety, and improve transportation efficiency.

In an example, the ITS may include a management device, a collection device, and a vehicle. The vehicle is configured with a drive mode, and the drive mode may be corresponding to at least one allowed scenario. For example, when the vehicle uses a first drive mode for driving within a first range that allows the vehicle to use the first drive mode, the management device may control the vehicle. When the first drive mode is a fully autonomous drive mode, and the vehicle is within the first range that allows the vehicle to use the fully autonomous drive mode for driving, the management device may obtain road condition information within the first range using the collection device, plan a driving path for the vehicle based on the obtained road condition information, and send the planned driving path to the vehicle such that the vehicle uses the fully autonomous drive mode to drive along the planned drive path within the first range.

At present, the management device in the ITS merely performs effective control over the vehicle when the vehicle uses the drive mode in the allowed scenario. Therefore, a control function of the ITS is relatively monotonous and the vehicle control flexibility is relatively low.

SUMMARY

In order to resolve a problem of low vehicle control flexibility, the present disclosure provides a vehicle control method, apparatus, and system. The technical solutions are as follows.

According to a first aspect, a vehicle control method is provided, and the method includes obtaining, by a management device, a first drive mode set, where the first drive mode set includes a drive mode that a first vehicle is currently allowed to use, determining, by the management device, a target drive mode in the first drive mode set, and sending, by the management device, indication information to a first vehicle control device, where the indication information includes information about the target drive mode, and the indication information is used to instruct the first vehicle control device to control the first vehicle to use the target drive mode for driving.

In an example, a vehicle control system may be an ITS, the ITS may include a management device and a vehicle, and a vehicle control device may be disposed on the vehicle. In a related technology, a vehicle is configured with a drive mode, and the drive mode may be corresponding to at least one allowed scenario. The management device in the ITS merely performs effective control over the vehicle when the vehicle uses a drive mode that is allowed to use in a current scenario for driving. Therefore, a control function of the ITS is relatively monotonous and the vehicle control flexibility is relatively low. In the present disclosure, the management device may obtain the first drive mode set including a driving mode that the first vehicle is allowed to use in a currently located scenario of the first vehicle, determine the target drive mode in the first drive mode set, and then send, to the first vehicle control device, the indication information including the information about the target drive mode, that is, instruct the first vehicle control device to control the first vehicle to use the target drive mode for driving such that a drive mode used by the first vehicle in the ITS is the target drive mode (namely the drive mode that the first vehicle is allowed to use in the current scenario). Therefore, the management device in the ITS can perform effective control over the first vehicle.

Optionally, the management device stores a correspondence between a drive mode and a priority, and determining, by the management device, a target drive mode in the first drive mode set includes determining, by the management device, a priority of a drive mode in the first drive mode set based on the correspondence between a drive mode and a priority, and determining, by the management device, a drive mode with a highest priority in drive modes of the first drive mode set as the target drive mode.

In an example, after determining the first drive mode set, the management device may determine a priority of each drive mode in the first drive mode set based on the locally-stored correspondence between a drive mode and a priority, and determine the drive mode with the highest priority in the first drive mode set as the target drive mode. This implements that a drive mode is selected as the target drive mode from drive modes that the first vehicle is currently allowed to use.

Optionally, sending, by the management device, indication information to a first vehicle control device includes sending, by the management device, the indication information to the first vehicle control device, where the indication information includes information about only one drive mode and the one drive mode is the target drive mode, or sending, by the management device, the indication information to the first vehicle control device, where the indication information includes information about at least two drive modes in the first drive mode set, drive mode information includes drive mode priority information, and the target drive mode is a drive mode with a highest priority in the at least two drive modes.

In one aspect, after the management device determines the target drive mode in the first drive mode set, the management device may generate the indication information that includes information about only the target drive mode, and send the indication information to the first vehicle control device to instruct the first vehicle control device to control the first vehicle to use the target drive mode for driving. In another aspect, after the management device determines the target drive mode in the first drive mode set, the management device may also generate the indication information that includes information about the at least two drive modes, where the at least two drive modes include the target drive mode determined by the management device, and information about each drive mode may include identification information and priority information of each drive mode. Because the target drive mode is the drive mode with the highest priority in the first drive mode set, the target drive mode is also the drive mode with the highest priority in the at least two drive modes. After the first vehicle control device receives the indication information that is sent by management device and that includes the information about the at least two drive modes, the first vehicle control device may determine the drive mode with the highest priority in the at least two drive modes as the target drive mode, then determine whether the first vehicle is configured with the target drive mode, and if the first vehicle is configured with the target drive mode, control the first vehicle to use the target drive mode for driving.

Optionally, obtaining, by the management device, a first drive mode set includes receiving, by the management device, request information sent by the first vehicle control device, where the request information is used to request for a drive mode that the first vehicle is allowed to use, determining, by the management device, a currently located scenario of the first vehicle based on the request information, obtaining, by the management device, a drive mode that the first vehicle is allowed to use in the currently located scenario, and determining, by the management device, the first drive mode set based on the drive mode that the first vehicle is allowed to use in the currently located scenario.

In an example, before the first vehicle travels, the first vehicle control device may send the request information to the management device, to request the management device to allocate, to the first vehicle, the drive mode that the first vehicle is allowed to use. After receiving the request information, the management device may determine the first drive mode set based on the request information, and then allocate, to the first vehicle, the target drive mode that the first vehicle is allowed to use. In this case, the first vehicle control device controls the first vehicle to use the target drive mode for driving. This ensures that from beginning of a drive, the first vehicle uses the drive mode that is allowed in the current scenario.

Optionally, the request information includes information about a user-selected drive mode, the request information is used for requesting to use the user-selected drive mode for driving, the first vehicle is configured with a preset drive mode set, the preset drive mode set includes at least one drive mode, and the user-selected drive mode belongs to the preset drive mode set, and determining, by the management device, a target drive mode in the first drive mode set includes determining, by the management device, whether the first drive mode set includes the user-selected drive mode, determining, by the management device, the user-selected drive mode as the target drive mode when the first drive mode set includes the user-selected drive mode, and determining, by the management device, a priority of each drive mode in the first drive mode set based on the correspondence between a drive mode and a priority, and determining the drive mode with the highest priority in the first drive mode set as the target drive mode when the first drive mode set does not include the user-selected drive mode.

In an example, before the first vehicle travels, the request information sent by the first vehicle control device to the management device may include the information about the user-selected drive mode, where the user-selected drive mode may be directly determined by the first vehicle control device, or the user-selected drive mode may be determined by the first vehicle control device based on user selection. After receiving the request information, the management device may obtain the first drive mode set, determine the user-selected drive mode based on the request information, and then determine whether the first drive mode set includes the user-selected drive mode. When the first drive mode set includes the user-selected drive mode, the management device may determine that the first vehicle is allowed to use the user-selected drive mode for driving in the current scenario, and instruct the first vehicle to use the user-selected drive mode for driving. When the first drive mode set does not include the user-selected drive mode, the management device may determine that the first vehicle is not allowed to use the user-selected drive mode for driving in the current scenario. In this case, the management device may determine a drive mode in the first drive mode set as the target drive mode, and instruct the first vehicle to use the target drive mode for driving.

Optionally, the management device stores a correspondence between a drive mode and a priority, and determining, by the management device, a target drive mode in the first drive mode set includes obtaining, by the management device, a current drive mode of the first vehicle, determining, by the management device, whether the first drive mode set includes the current drive mode of the first vehicle, and determining, by the management device, a priority of each drive mode in the first drive mode set based on the correspondence between a drive mode and a priority, and determining a drive mode with a highest priority in the first drive mode set as the target drive mode when the first drive mode set does not include the current drive mode of the first vehicle.

Further, during a process in which the first vehicle uses a drive mode for driving, after determining the first drive mode set, the management device may further determine the current drive mode of the first vehicle, and determine whether the first drive mode set includes the current drive mode of the first vehicle, that is, determine whether the first vehicle is allowed to use the current drive mode of the first vehicle for driving in the currently located scenario of the first vehicle. When the first drive mode set includes the current drive mode of the first vehicle, the management device may determine that the first vehicle is allowed to use the current drive mode of the first vehicle for driving in the currently located scenario of the first vehicle, and the management device may perform no action. When the first drive mode set does not include the current drive mode of the first vehicle, the management device may determine that the first vehicle is not allowed to use the current drive mode of the first vehicle for driving in the currently located scenario of the first vehicle. The management device may determine a drive mode in the first drive mode set as the target drive mode, send the indication information that includes the information about the target drive mode to the first vehicle control device, and instruct the first vehicle to use the target drive mode for driving.

Optionally, the management device stores a correspondence between a drive mode and a safe distance threshold, and a correspondence between a drive mode and a speed threshold, and after obtaining, by the management device, a first drive mode set, the method further includes obtaining, by the management device, a current drive mode of the first vehicle, determining, by the management device, whether the first drive mode set includes the current drive mode of the first vehicle, and instructing, by the management device based on the current drive mode of the first vehicle and the correspondence between a drive mode and a safe distance threshold, the first vehicle control device to control the first vehicle to adjust a safe distance between the first vehicle and a vehicle ahead or behind when the first drive mode set includes the current drive mode of the first vehicle, where an adjusted safe distance between the first vehicle and the vehicle ahead or behind is greater than or equal to a safe distance threshold corresponding to the current drive mode of the first vehicle, or instructing, by the management device based on the current drive mode of the first vehicle and the correspondence between a drive mode and a speed threshold, the first vehicle control device to control the first vehicle to adjust a driving speed of the first vehicle when the first drive mode set includes the current drive mode of the first vehicle, where an adjusted driving speed of the first vehicle is less than or equal to a speed threshold corresponding to the current drive mode of the first vehicle.

If the first drive mode set includes the current drive mode of the first vehicle, the management device may determine that the first vehicle is allowed to use the current drive mode of the first vehicle for driving in the currently located scenario of the first vehicle, and the management device may instruct, based on the current drive mode of the first vehicle, the first vehicle control device to control the first vehicle in order to increase vehicle control efficiency.

Optionally, obtaining, by the management device, a current drive mode of the first vehicle includes receiving, by the management device, first notification information sent by the first vehicle control device, where the first notification information includes information about the current drive mode of the first vehicle, and determining, by the management device, the current drive mode of the first vehicle based on the first notification information.

In an example, the first vehicle control device may send the first notification information that includes the information about the current drive mode of the first vehicle to the management device in real time, e.g., report the current drive mode of the first vehicle to the management device in real time.

Optionally, the method further includes obtaining, by the management device, a current drive mode of a second vehicle, where a distance between the first vehicle and the second vehicle is less than a preset distance, and sending, by the management device, second notification information to the first vehicle control device, where the second notification information includes information about the current drive mode of the second vehicle.

After obtaining the current drive mode of the second vehicle, the management device may send the second notification information that includes the information about the current drive mode of the second vehicle to the first vehicle control device. That is, the management device may inform the first vehicle control device of the current drive mode of the second vehicle such that when the second vehicle travels ahead of the first vehicle and the first vehicle needs to overtake, the first vehicle control device may determine a manner of informing a driver of the second vehicle of an overtaking attempt of the first vehicle such that the first vehicle effectively informs the driver of the second vehicle of the overtaking attempt. This improves overtaking efficiency and avoids a traffic accident.

According to a second aspect, a vehicle control method is provided, and the method includes receiving, by a first vehicle control device, indication information sent by a management device, where the indication information includes information about at least two drive modes, drive mode information includes drive mode priority information, and the at least two drive modes are drive modes that a first vehicle is currently allowed to use, determining, by the first vehicle control device, based on priority information of the at least two drive modes in the indication information, a drive mode with a highest priority in the at least two drive modes as a target drive mode, determining, by the first vehicle control device, whether a preset drive mode set includes the target drive mode, where the first vehicle is configured with the preset drive mode set, and the preset drive mode set includes at least one drive mode, and controlling, by the first vehicle control device, the first vehicle to use the target drive mode for driving when the preset drive mode set includes the target drive mode.

According to a third aspect, a vehicle control apparatus is provided, and the vehicle control apparatus includes a first obtaining module configured to obtain a first drive mode set, where the first drive mode set includes a drive mode that a first vehicle is currently allowed to use, a determining module configured to determine a target drive mode in the first drive mode set obtained by the first obtaining module, and a first sending module configured to send indication information to a first vehicle control device, where the indication information includes information about the target drive mode determined by the determining module, and the indication information is used to instruct the first vehicle control device to control the first vehicle to use the target drive mode for driving.

Optionally, the management device stores a correspondence between a drive mode and a priority, and the determining module is further configured to determine a priority of a drive mode in the first drive mode set obtained by the first obtaining module based on the correspondence between a drive mode and a priority, and determine a drive mode with a highest priority in drive modes of the first drive mode set as the target drive mode.

Optionally, the first sending module is further configured to send the indication information to the first vehicle control device, where the indication information includes information about only one drive mode and the one drive mode is the target drive mode determined by the determining module, or send the indication information to the first vehicle control device, where the indication information includes information about at least two drive modes in the first drive mode set obtained by the first obtaining module, drive mode information includes drive mode priority information, and the target drive mode determined by the determining module is a drive mode with a highest priority in the at least two drive modes.

Optionally, the first obtaining module is further configured to receive request information sent by the first vehicle control device, where the request information is used to request for a drive mode that the first vehicle is allowed to use, determine a currently located scenario of the first vehicle based on the request information, obtain a drive mode that the first vehicle is allowed to use in the currently located scenario, and determine the first drive mode set based on the drive mode that the first vehicle is allowed to use in the currently located scenario.

Optionally, the request information includes information about a user-selected drive mode, the request information is used for requesting to use the user-selected drive mode for driving, the first vehicle is configured with a preset drive mode set, the preset drive mode set includes at least one drive mode, and the user-selected drive mode belongs to the preset drive mode set, and the determining module is further configured to determine whether the first drive mode set obtained by the first obtaining module includes the user-selected drive mode, determine the user-selected drive mode as the target drive mode when the first drive mode set includes the user-selected drive mode, and determine a priority of each drive mode in the first drive mode set based on the correspondence between a drive mode and a priority, and determine the drive mode with the highest priority in the first drive mode set as the target drive mode when the first drive mode set does not include the user-selected drive mode.

Optionally, the management device stores a correspondence between a drive mode and a priority, and the determining module is further configured to obtain a current drive mode of the first vehicle, determine whether the first drive mode set obtained by the first obtaining module includes the current drive mode of the first vehicle, and determine a priority of each drive mode in the first drive mode set based on the correspondence between a drive mode and a priority, and determine a drive mode with a highest priority in the first drive mode set as the target drive mode when the first drive mode set does not include the current drive mode of the first vehicle.

Optionally, the management device stores a correspondence between a drive mode and a safe distance threshold, and a correspondence between a drive mode and a speed threshold, and the vehicle control apparatus further includes a second obtaining module configured to obtain a current drive mode of the first vehicle, a judging module configured to determine whether the first drive mode set obtained by the first obtaining module includes the current drive mode of the first vehicle, and an indication module configured to instruct, based on the current drive mode of the first vehicle and the correspondence between a drive mode and a safe distance threshold, the first vehicle control device to control the first vehicle to adjust a safe distance between the first vehicle and a vehicle ahead or behind when the first drive mode set includes the current drive mode of the first vehicle, where an adjusted safe distance between the first vehicle and the vehicle ahead or behind is greater than or equal to a safe distance threshold corresponding to the current drive mode of the first vehicle, or instruct, based on the current drive mode of the first vehicle and the correspondence between a drive mode and a speed threshold, the first vehicle control device to control the first vehicle to adjust a driving speed of the first vehicle when the first drive mode set includes the current drive mode of the first vehicle, where an adjusted driving speed of the first vehicle is less than or equal to a speed threshold corresponding to the current drive mode of the first vehicle.

Optionally, the second obtaining module is further configured to receive first notification information sent by the first vehicle control device, where the first notification information includes information about the current drive mode of the first vehicle, and determine the current drive mode of the first vehicle based on the first notification information.

Optionally, the vehicle control apparatus further includes a third obtaining module configured to obtain a current drive mode of a second vehicle, where a distance between the first vehicle and the second vehicle is less than a preset distance, and a second sending module configured to send second notification information to the first vehicle control device, where the second notification information includes information about the current drive mode of the second vehicle.

According to a fourth aspect, a vehicle control apparatus is provided, and the vehicle control apparatus includes a receiving module configured to receive indication information sent by a management device, where the indication information includes information about at least two drive modes, drive mode information includes drive mode priority information, and the at least two drive modes are drive modes that a first vehicle is currently allowed to use.

The vehicle control apparatus further includes a determining module configured to determine, based on priority information of the at least two drive modes in the indication information received by the receiving module, a drive mode with a highest priority in the at least two drive modes as a target drive mode, a judging module configured to determine whether a preset drive mode set includes the target drive mode determined by the determining module, where the first vehicle is configured with the preset drive mode set, and the preset drive mode set includes at least one drive mode, and a control module configured to, when the judging module determines that the preset drive mode set includes the target drive mode, control the first vehicle to use the target drive mode for driving.

According to a fifth aspect, a vehicle control system is provided, and the vehicle control system includes a management device and a first vehicle control device, where the management device includes the vehicle control apparatus in the third aspect, and the first vehicle control device includes the vehicle control apparatus in the fourth aspect.

According to a sixth aspect, a vehicle control apparatus is provided and applied to a management device, where the vehicle control apparatus includes at least one processor, at least one network interface, a memory, and at least one communications bus, where the processor is configured to execute a program stored in the memory in order to implement the vehicle control method in the first aspect.

According to a seventh aspect, a vehicle control apparatus is provided and applied to a first vehicle control device, and the vehicle control apparatus includes at least one processor, a memory, a communications module, at least one communications bus, and a communications antenna, where the communications bus is configured to implement a communicative connection between these components, the communications module may be configured to perform long-distance communication, the communications antenna is configured to send and receive a communications signal, and the processor is configured to execute a program stored in the memory in order to implement the vehicle control method in the second aspect.

According to an eighth aspect, a vehicle control system is provided, and the vehicle control system includes a management device and a first vehicle control device, where the management device includes the vehicle control apparatus in the sixth aspect, and the first vehicle control device includes the vehicle control apparatus in the seventh aspect.

The present disclosure provides a vehicle control method, apparatus, and system. In the vehicle control method, the management device first obtains the first drive mode set including the drive mode that the first vehicle is currently allowed to use, determines the target drive mode in the first drive mode set, and then sends, to the first vehicle control device, the indication information including the information about the target drive mode such that the first vehicle control device, after receiving the indication information, controls the first vehicle to use the target drive mode for driving. In addition, the target drive mode is the drive mode that the first vehicle is currently allowed to use. Therefore, this ensures that a drive mode used by the first vehicle is the drive mode that the first vehicle is currently allowed to use, and the management device can perform effective control over the first vehicle. This enriches a control function of the vehicle control system and improves vehicle control flexibility.

It should be understood that the foregoing general description and the following detailed description are merely illustrative and explanative, and are not intended to limit the present disclosure.

BRIEF DESCRIPTION OF DRAWINGS

To describe the technical solutions in some embodiments of the present disclosure more clearly, the following briefly describes the accompanying drawings describing some of the embodiments. The accompanying drawings in the following description show merely some embodiments of the present disclosure, and persons of ordinary skill in the art may still derive other drawings from these accompanying drawings without creative efforts.

It should be understood that the foregoing general description and the following detailed description are merely illustrative and explanative, and are not intended to limit the present disclosure.

DESCRIPTION OF EMBODIMENTS

To make the objectives, technical solutions, and advantages of the present disclosure clearer, the following further describes the embodiments of the present disclosure in detail with reference to the accompanying drawings.

An ITS can effectively utilize transportation facilities to reduce traffic load, reduce environmental pollution, ensure traffic safety, and improve transportation efficiency. The ITS is an important part of an intelligent city. Development of the ITS is closely linked to development of Internet of Things (IoT), and the ITS is representation of IoT of the transportation industry. The ITS includes a collection device, a vehicle, a driver, and a management device. The management device in the ITS has functions of vehicle control, transportation information collection, and transportation management.

Figure 1:
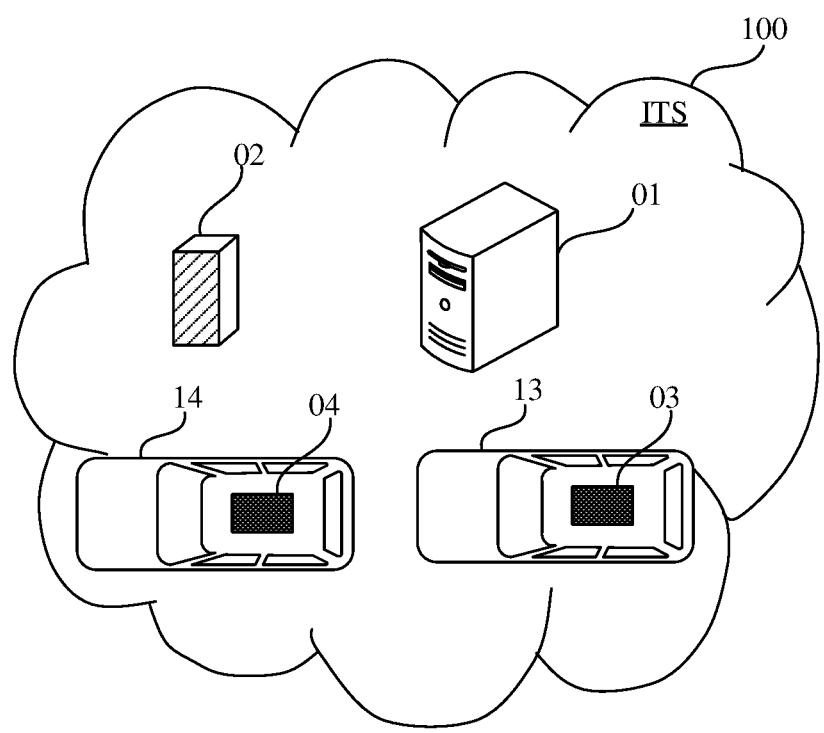
FIG. 1 is a schematic diagram of an application scenario of a vehicle control method according to an embodiment of the present disclosure.

FIG. 1 is a schematic diagram of an application scenario of a vehicle control method according to an embodiment of the present disclosure. As shown in FIG. 1, an ITS 100 may include a management device 01, a collection device 02, a first vehicle control device 03, and a second vehicle control device 04. The first vehicle control device 03 may be disposed on a first vehicle 13 and the second vehicle control device 04 may be disposed on a second vehicle 14. A communicative connection (not shown in FIG. 1) may be established between any two devices in the ITS 100. The first vehicle 13 and the second vehicle 14 each are configured with at least one drive mode, the at least one drive mode configured on the first vehicle 13 forms a preset drive mode set, and a distance between the first vehicle 13 and the second vehicle 14 is less than a preset distance. In an example, the ITS 100 may include more than one vehicle that is configured with at least one drive mode, and the first vehicle 13 and the second vehicle 14 may be any two vehicles at a distance smaller than the preset distance in the more than one vehicle configured with the at least one drive mode. The first vehicle 13 and the second vehicle 14 may both travel on a road (not shown in FIG. 1) and the collection device 02 may be a road traffic facility (not shown in FIG. 1) disposed on the road.

In FIG. 1, the first vehicle control device 03 disposed on the first vehicle 13 and the second vehicle control device 04 disposed on the second vehicle 14 are used as an example. In an embodiment, the first vehicle control device 03 may be disposed on the first vehicle 13, or may not be disposed on the first vehicle 13, and the second vehicle control device 04 may be disposed on the second vehicle 14, or may not be disposed on the second vehicle 14. This is not limited in this embodiment of the present disclosure.

Figure 2:
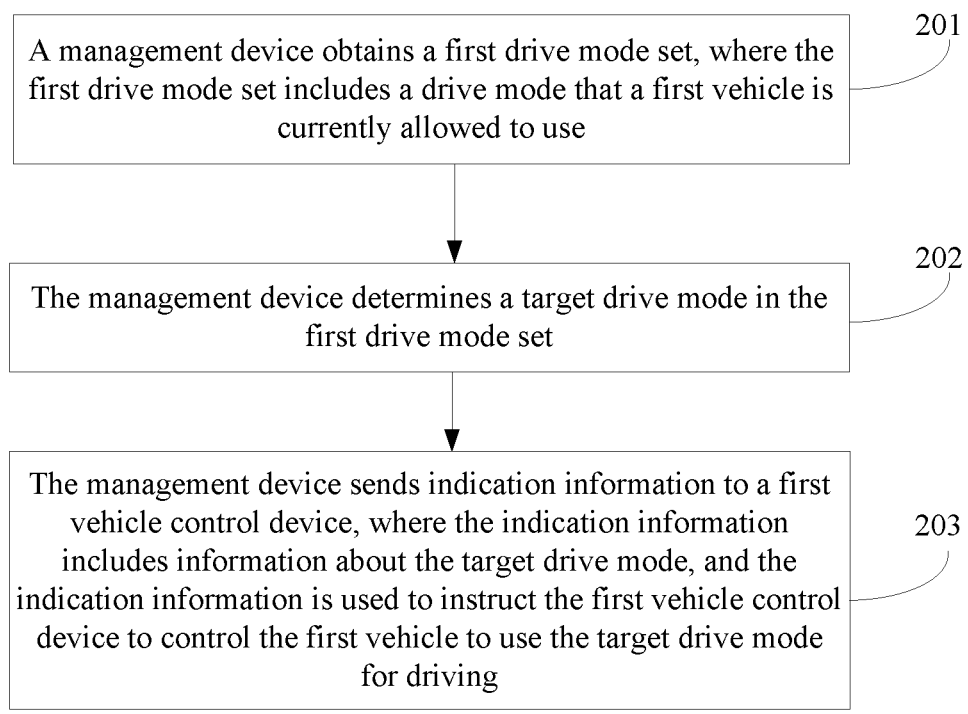
FIG. 2 is a method flowchart of a vehicle control method according to an embodiment of the present disclosure.

As shown in FIG. 2, an embodiment of the present disclosure provides a vehicle control method. The vehicle control method may be applied to the management device 01 in the ITS 100 shown in FIG. 1, and the vehicle control method may include the following steps.

Step 201: A management device obtains a first drive mode set, where the first drive mode set includes a drive mode that a first vehicle is currently allowed to use.

Step 202: The management device determines a target drive mode in the first drive mode set.

Step 203: The management device sends indication information to a first vehicle control device, where the indication information includes information about the target drive mode, and the indication information is used to instruct the first vehicle control device to control the first vehicle to use the target drive mode for driving.

To sum up, according to the vehicle control method provided in this embodiment of the present disclosure, the management device first obtains the first drive mode set including the drive mode that the first vehicle is currently allowed to use, determines the target drive mode in the first drive mode set, and then sends, to the first vehicle control device, the indication information including the information about the target drive mode such that the first vehicle control device, after receiving the indication information, controls the first vehicle to use the target drive mode for driving. In addition, the target drive mode is the drive mode that the first vehicle is currently allowed to use. Therefore, this ensures that a drive mode used by the first vehicle is the drive mode that the first vehicle is currently allowed to use, and the management device can perform effective control over the first vehicle. This enriches a control function of a vehicle control system and improves vehicle control flexibility.

Optionally, the management device stores a correspondence between a drive mode and a priority, and step 202 may include determining, by the management device, a priority of a drive mode in the first drive mode set based on the correspondence between a drive mode and a priority, and determining, by the management device, a drive mode with a highest priority in drive modes of the first drive mode set as the target drive mode.

Optionally, step 203 may include sending, by the management device, the indication information to the first vehicle control device, where the indication information includes information about only one drive mode and the one drive mode is the target drive mode, or sending, by the management device, the indication information to the first vehicle control device, where the indication information includes information about at least two drive modes in the first drive mode set, drive mode information includes drive mode priority information, and the target drive mode is a drive mode with a highest priority in the at least two drive modes.

Optionally, step 201 may include receiving, by the management device, request information sent by the first vehicle control device, where the request information is used to request for a drive mode that the first vehicle is allowed to use, determining, by the management device, a currently located scenario of the first vehicle based on the request information, obtaining, by the management device, a drive mode that the first vehicle is allowed to use in the currently located scenario, and determining, by the management device, the first drive mode set based on the drive mode that the first vehicle is allowed to use in the currently located scenario.

Optionally, the request information includes information about a user-selected drive mode, the request information is used for requesting to use the user-selected drive mode for driving, the first vehicle is configured with a preset drive mode set, the preset drive mode set includes at least one drive mode, and the user-selected drive mode belongs to the preset drive mode set, and step 202 may include determining, by the management device, whether the first drive mode set includes the user-selected drive mode, determining, by the management device, the user-selected drive mode as the target drive mode when the first drive mode set includes the user-selected drive mode, and determining, by the management device, a priority of each drive mode in the first drive mode set based on the correspondence between a drive mode and a priority, and determining the drive mode with the highest priority in the first drive mode set as the target drive mode when the first drive mode set does not include the user-selected drive mode.

Optionally, the management device stores a correspondence between a drive mode and a priority, and step 202 may include obtaining, by the management device, a current drive mode of the first vehicle, determining, by the management device, whether the first drive mode set includes the current drive mode of the first vehicle, and determining, by the management device, a priority of each drive mode in the first drive mode set based on the correspondence between a drive mode and a priority, and determining the drive mode with the highest priority in the first drive mode set as the target drive mode when the first drive mode set does not include the current drive mode of the first vehicle.

Optionally, the management device stores a correspondence between a drive mode and a safe distance threshold, and a correspondence between a drive mode and a speed threshold, and after step 201, the vehicle control method may further include obtaining, by the management device, a current drive mode of the first vehicle, determining, by the management device, whether the first drive mode set includes the current drive mode of the first vehicle, and instructing, by the management device, based on the current drive mode of the first vehicle and the correspondence between a drive mode and a safe distance threshold, the first vehicle control device to control the first vehicle to adjust a safe distance between the first vehicle and a vehicle ahead or behind when the first drive mode set includes the current drive mode of the first vehicle, where an adjusted safe distance between the first vehicle and the vehicle ahead or behind is greater than or equal to a safe distance threshold corresponding to the current drive mode of the first vehicle, or instructing, by the management device, based on the current drive mode of the first vehicle and the correspondence between a drive mode and a speed threshold, the first vehicle control device to control the first vehicle to adjust a driving speed of the first vehicle when the first drive mode set includes the current drive mode of the first vehicle, where an adjusted driving speed of the first vehicle is less than or equal to a speed threshold corresponding to the current drive mode of the first vehicle.

Optionally, obtaining, by the management device, a current drive mode of the first vehicle may include receiving, by the management device, first notification information sent by the first vehicle control device, where the first notification information includes information about the current drive mode of the first vehicle, and determining, by the management device, the current drive mode of the first vehicle based on the first notification information.

Optionally, the vehicle control method may further include obtaining, by the management device, a current drive mode of a second vehicle, where a distance between the first vehicle and the second vehicle is less than a preset distance, and sending, by the management device, second notification information to the first vehicle control device, where the second notification information includes information about the current drive mode of the second vehicle.

To sum up, according to the vehicle control method provided in this embodiment of the present disclosure, the management device first obtains the first drive mode set including the drive mode that the first vehicle is currently allowed to use, determines the target drive mode in the first drive mode set, and then sends, to the first vehicle control device, the indication information including the information about the target drive mode such that the first vehicle control device, after receiving the indication information, controls the first vehicle to use the target drive mode for driving. In addition, the target drive mode is the drive mode that the first vehicle is currently allowed to use. Therefore, this ensures that a drive mode used by the first vehicle is the drive mode that the first vehicle is currently allowed to use, and the management device can perform effective control over the first vehicle. This enriches a control function of a vehicle control system and improves vehicle control flexibility.

Figure 3:
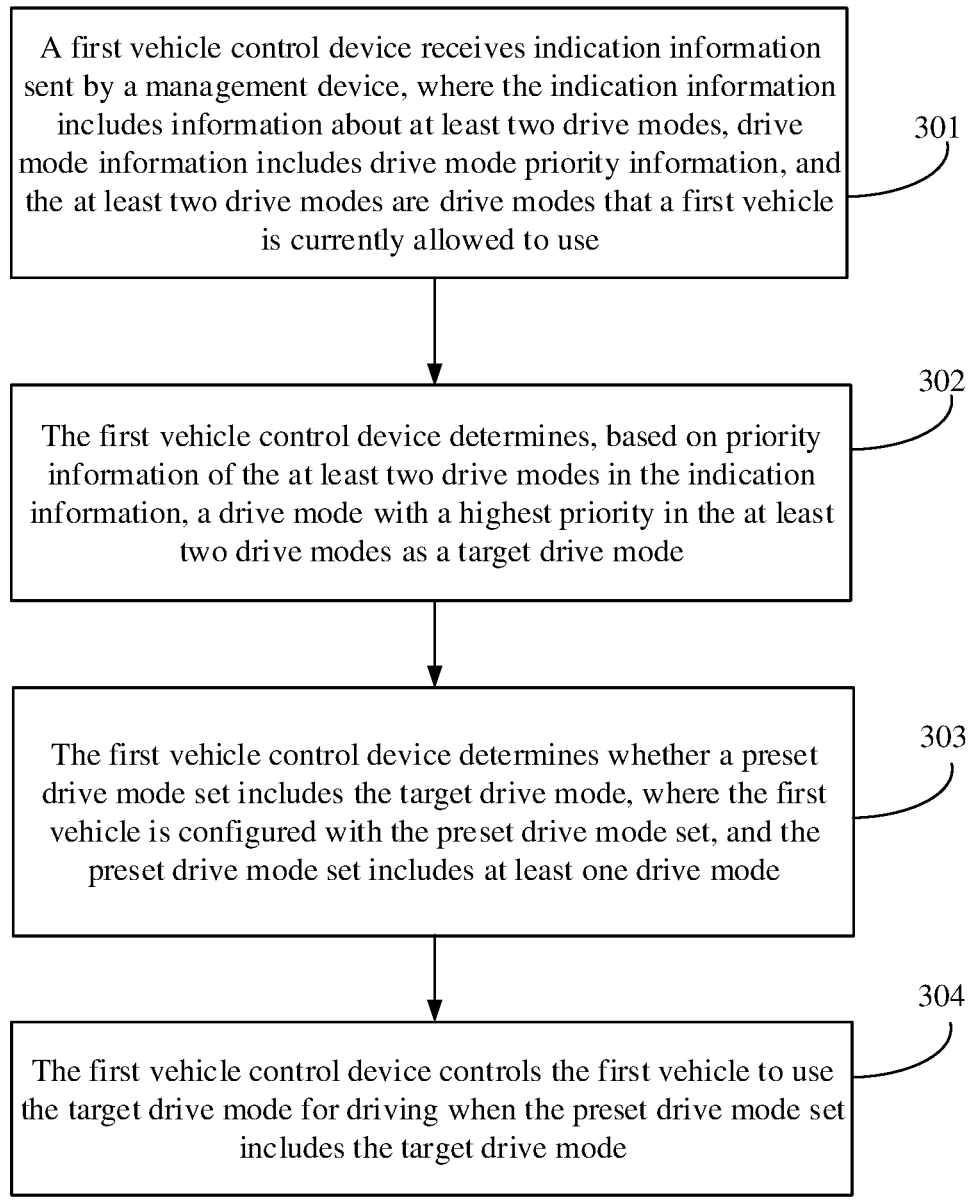
FIG. 3 is a method flowchart of another vehicle control method according to an embodiment of the present disclosure.

As shown in FIG. 3, an embodiment of the present disclosure provides another vehicle control method. The vehicle control method may be applied to the first vehicle control device 03 in the ITS 100 shown in FIG. 1, and the vehicle control method may include the following steps.

Step 301: A first vehicle control device receives indication information sent by a management device, where the indication information includes information about at least two drive modes, drive mode information includes drive mode priority information, and the at least two drive modes are drive modes that a first vehicle is currently allowed to use.

Step 302: The first vehicle control device determines, based on priority information of the at least two drive modes in the indication information, a drive mode with a highest priority in the at least two drive modes as a target drive mode.

Step 303: The first vehicle control device determines whether a preset drive mode set includes the target drive mode, where the first vehicle is configured with the preset drive mode set, and the preset drive mode set includes at least one drive mode.

Step 304: The first vehicle control device controls the first vehicle to use the target drive mode for driving when the preset drive mode set includes the target drive mode.

To sum up, according to the vehicle control method provided in this embodiment of the present disclosure, the indication information sent by the management device and received by the first vehicle control device includes the information about the at least two drive modes, and the at least two drive modes are drive modes that the first vehicle is currently allowed to use. Therefore, the first vehicle control device may determine a drive mode in the at least two drive modes as the target drive mode, and determine whether the first vehicle is configured with the target drive mode. If the first vehicle is configured with the target drive mode, the first vehicle is controlled to use the target drive mode for driving. In addition, the target drive mode is the drive mode that the first vehicle is currently allowed to use. Therefore, this ensures that a drive mode used by the first vehicle is the drive mode that the first vehicle is currently allowed to use, and the management device can perform effective control over the first vehicle. This enriches a control function of a vehicle control system and improves vehicle control flexibility.

Figure 4:
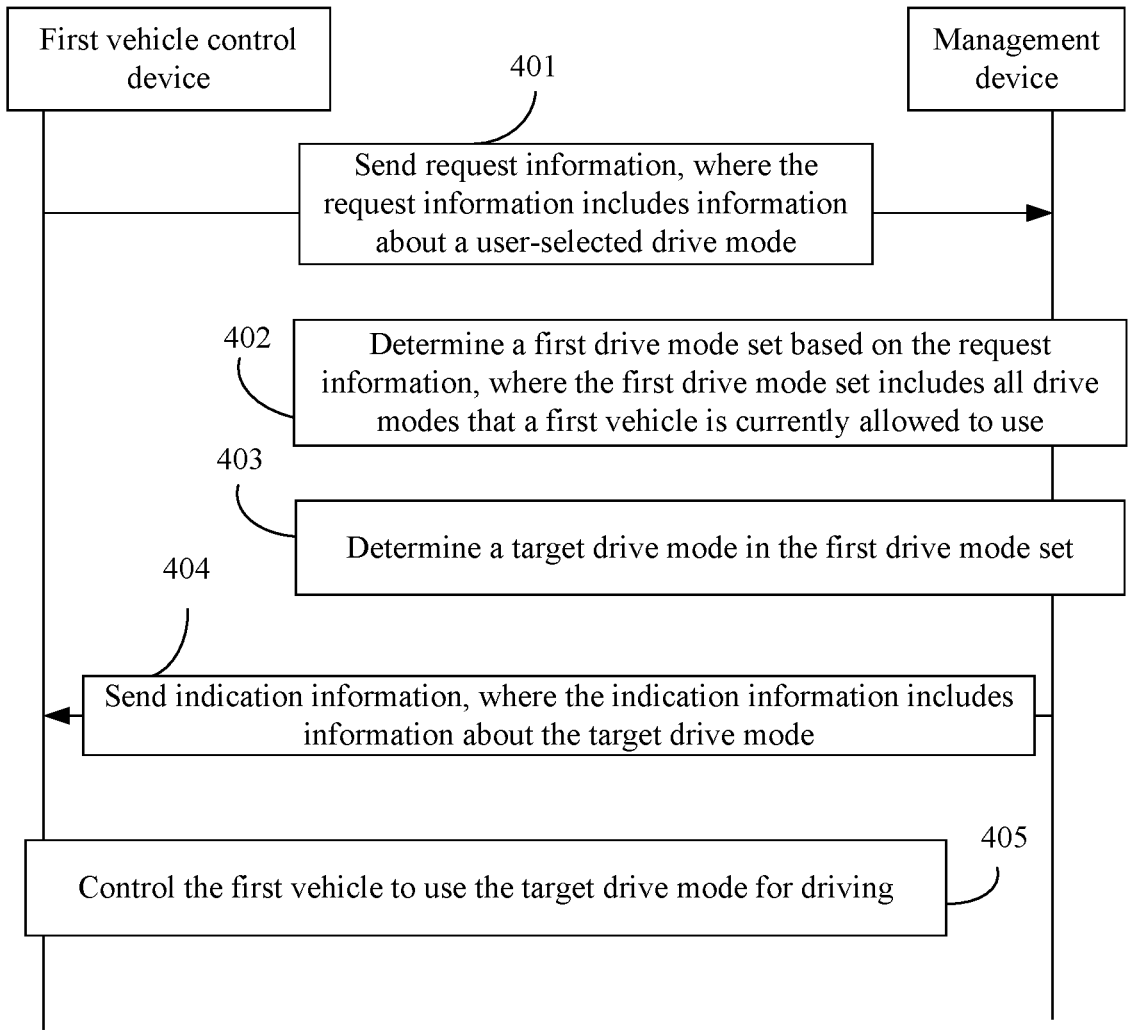
FIG. 4 is a method flowchart of still another vehicle control method according to an embodiment of the present disclosure.

As shown in FIG. 4, an embodiment of the present disclosure provides still another vehicle control method. The vehicle control method may be applied to a vehicle control system and the vehicle control system may be the ITS 100 shown in FIG. 1. The vehicle control method may include the following steps.

Step 401: A first vehicle control device sends request information to a management device, where the request information includes information about a user-selected drive mode.

A first vehicle may be configured with at least one drive mode and the at least one drive mode configured on the first vehicle forms a preset drive mode set, that is, the first vehicle may use any drive mode in the preset drive mode set for driving. When the first vehicle is to travel, a driver of the first vehicle may determine a drive mode in the preset drive mode set as the user-selected drive mode (namely a drive mode that the first vehicle needs to use), and inform the first vehicle control device of the user-selected drive mode such that the first vehicle control device can generate the request information including the information about the user-selected drive mode. The request information may be used for requesting to use the user-selected drive mode for driving and a drive mode that the first vehicle is allowed to use. After determining the user-selected drive mode, the first vehicle control device may generate the request information including the information about the user-selected drive mode, and send the request information to the management device. Further, the user-selected drive mode belongs to the preset drive mode set. That is, the first vehicle is configured with all drive modes that the first vehicle needs to use.

In an example, the driver of the first vehicle may determine the user-selected drive mode (namely the drive mode that the first vehicle needs to use) based on a currently located scenario (such as a highway environment or a foggy weather condition) of the first vehicle, or based on a particular requirement (such as a function test for the first vehicle, or fault detection for the first vehicle), and may inform the first vehicle control device of the user-selected drive mode by pressing a preset button or in a voice input manner. Optionally, the user-selected drive mode may be directly determined by the first vehicle control device. This is not limited in this embodiment of the present disclosure.

In an example, the preset drive mode set may include a zeroth-level drive mode (namely a non-autonomous drive mode), a first-level drive mode (namely a driver-aided drive mode), a second-level drive mode (namely a partially autonomous drive mode), a third-level drive mode (namely a conditionally autonomous drive mode), a fourth-level drive mode (namely a highly autonomous drive mode), and a fifth-level drive mode (namely a fully autonomous drive mode).

In the zeroth-level drive mode (namely the non-autonomous drive mode), the driver is fully responsible for executing all dynamic driving tasks. In an example, when driving a vehicle, the driver may execute the dynamic driving tasks including operational driving tasks and technical driving tasks. The operational driving tasks include driving tasks such as steering, braking, accelerating, and vehicle and road monitoring. The technical driving tasks include driving tasks such as responding to an event, deciding on lane changing, turning, and using a signal. It should be noted that the dynamic driving tasks executed by the driver may not include directional driving tasks. The directional driving tasks may include driving tasks such as determining a destination and determining an intermediate place.

In the first-level drive mode (namely the driver-aided drive mode), a driver assistance system (DAS) executes driving tasks of turning, accelerating, and decelerating based on driving environment information, and the driver executes other driving tasks, different from the driving tasks of turning, accelerating, and decelerating, in the dynamic driving tasks. It should be noted that a vehicle using the first-level drive mode may be configured with one DAS.

In the second-level drive mode (namely the partially autonomous drive mode), one or more DAS executes the driving tasks of turning, accelerating, and decelerating based on the driving environment information, and the driver executes other driving tasks, different from the driving tasks of turning, accelerating, and decelerating, in the dynamic driving tasks. It should be noted that a vehicle using the second-level drive mode may be configured with a plurality of DASs. When the vehicle uses the second-level drive mode for driving, the vehicle may use one or more of the plurality of DASs to execute the driving tasks of turning, accelerating, and decelerating.

In the third-level drive mode (namely the conditionally autonomous drive mode), an automated driving system (ADS) executes all the dynamic driving tasks, and when the ADS needs to request the driver for interference, the driver needs to respond properly. For example, when the ADS becomes faulty, the driver executes all the dynamic driving tasks.

In the fourth-level drive mode (namely the highly autonomous drive mode), the ADS executes all the dynamic driving tasks, and when the ADS needs to request the driver for interference, the driver does not need to respond properly.

In the fifth-level drive mode (namely the fully autonomous drive mode), the ADS executes all the dynamic driving tasks within a preset range. Automated driving may effectively avoid deficiency of a human driver in determining, responding, and operating. This helps improve traffic safety. Automated driving may better utilize information and resources to improve traffic efficiency. A vehicle using the fully autonomous drive mode for driving is also called an automated vehicle.

It should be noted that the ITS defines identification information of each drive mode. The information about the user-selected drive mode in the request information may include identification information of the user-selected drive mode, and priority information of the user-selected drive mode. The identification information of the user-selected drive mode may be an Arabic numeral (such as 0, 1, 2, 3, 4, and 5). The identification information of the zeroth-level drive mode (namely the non-autonomous drive mode) may be 0, the identification information of the first-level drive mode (namely the driver-aided drive mode) may be 1, the identification information of the second-level drive mode (namely the partially autonomous drive mode) may be 2, the identification information of the third-level drive mode (namely the conditionally autonomous drive mode) may be 3, the identification information of the fourth-level drive mode (namely the highly autonomous drive mode) may be 4, and the identification information of the fifth-level drive mode (namely the fully autonomous drive mode) may be 5. In an example, the request information may include information about only one user-selected drive mode, and the user-selected drive mode is the third-level drive mode. Then, the request information may be {3} and the third-level drive mode has a highest priority in the request information.

Optionally, in step 401, the first vehicle control device may further determine at least two user-selected drive modes in the preset drive mode set, and generate request information including information about the at least two user-selected drive modes. Priorities of the at least two user-selected drive modes may be different. In an example, the request information may be a sequence constituted by the information of the at least two user-selected drive modes, or information of each drive mode in the request information may include drive mode identification information and drive mode priority information. For example, the at least two user-selected drive modes may be the third-level drive mode, the second-level drive mode, and the first-level drive mode. A priority of the third-level drive mode is higher than a priority of the second-level drive mode, the priority of the second-level drive mode is higher than a priority of the first-level drive mode, and the request information may include {3, 2, 1}.

Step 402: The management device determines a first drive mode set based on the request information, where the first drive mode set includes all drive modes that a first vehicle is currently allowed to use.

After the management device receives the request information sent by the first vehicle control device, the management device may determine a drive mode that the first vehicle is currently allowed to use based on the request information.

In a first aspect, a vehicle may be allowed to use at least one drive mode in each geographical area. The management device may send geographical location enquiry information to the first vehicle control device such that after the first vehicle control device receives the geographical location enquiry information sent by the management device, the first vehicle control device sends geographical location information of the first vehicle to the management device, and the management device determines a geographical location of the first vehicle based on the geographical location information of the first vehicle. Alternatively, after the management device receives the request information sent by the first vehicle control device, the management device may use a collection device to collect the geographical location information of the first vehicle in order to determine the geographical location of the first vehicle. After determining the geographical location of the first vehicle, the management device may determine a geographical area to which the geographical location of the first vehicle belongs, and then determine the first drive mode set including the drive mode that the first vehicle is allowed to use in the geographical area to which the geographical location of the first vehicle belongs.

In a second aspect, the vehicle may be allowed to use at least one drive mode in each period of time. After the management device receives the request information sent by the first vehicle control device, the management device may determine, based on a time at which the first vehicle control device sends the request information, a period of time to which the time at which the first vehicle control device sends the request information belongs in order to determine the first drive mode set including the drive mode that the first vehicle is allowed to use in the period of time. In an example, the request information may further include a request information generation time. After receiving the request information, the management device may use the request information generation time as the time at which the first vehicle control device sends the request information.

In a third aspect, in an embodiment, a vehicle driving rule is usually restricted using a regulation, and the vehicle may be allowed to use at least one drive mode in each set of regulation. After the management device receives the request information sent by the first vehicle control device, the management device may determine, according to a currently used regulation, the first drive mode set including the drive mode that the first vehicle is allowed to use in the currently used regulation.

Optionally, the management device may also determine the first drive mode set based on both the geographical location of the first vehicle and the time at which the first vehicle control device sends the request information, determine the first drive mode set based on both the geographical location of the first vehicle and the currently used regulation, determine the first drive mode set based on both the time at which the first vehicle control device sends the request information and the currently used regulation, or determine the first drive mode set based on the geographical location of the first vehicle, the time at which the first vehicle control device sends the request information, and the currently used regulation.

Step 403: The management device determines a target drive mode in the first drive mode set.

Further, the request information may include only one user-selected drive mode. After the management device determines the first drive mode set and determines the user-selected drive mode from the request information, the management device may determine whether the first drive mode set includes the user-selected drive mode, e.g., determine whether the vehicle is allowed to use the user-selected drive mode for driving in the current scenario. Further, the management device may compare the user-selected drive mode with each drive mode in the first drive mode set in order to determine whether the user-selected drive mode is the same as a drive mode in the drive mode set. If the user-selected drive mode is the same as a drive mode in the drive mode set, the management device may determine that the first drive mode set includes the user-selected drive mode, if the user-selected drive mode is different from any drive mode in the drive mode set, the management device may determine that the first drive mode set does not include the user-selected drive mode.

In an example, if the user-selected drive mode is the third-level drive mode and the first drive mode set includes the fourth-level drive mode, the third-level drive mode, and the second-level drive mode, the management device may determine, through comparison, that the first drive mode set includes the user-selected drive mode. If the user-selected drive mode is the third-level drive mode and the first drive mode set includes the fifth-level drive mode and the fourth-level drive mode, the management device may determine, through comparison, that the first drive mode set does not include the user-selected drive mode. If the first drive mode set includes the user-selected drive mode, the management device may determine the user-selected drive mode as the target drive mode, if the first drive mode set does not include the user-selected drive mode, the management device may determine a drive mode in the first drive mode as the target drive mode. Further, the management device may store a correspondence between a drive mode and a priority. The management device may determine a priority of each drive mode in the first drive mode set based on the correspondence between a drive mode and a priority, and determine a drive mode with a highest priority in the first drive mode set as the target drive mode.

It should be noted that the request information in step 401 may alternatively include the information about the at least two user-selected drive modes. Therefore, in step 403, the management device may determine whether the first drive mode set includes the at least two user-selected drive modes, and determine the target drive mode based on a determining result.

In an example, if the at least two user-selected drive modes may include the third-level drive mode, the second-level drive mode, and the first-level drive mode, and the first drive mode set includes the fourth-level drive mode and the third-level drive mode, the management device may determine, through comparison, that the first drive mode set may include the third-level drive mode in a set of the at least two user-selected drive modes. The management device may determine the third-level drive mode as the target drive mode, indication information includes the information about only the third-level drive mode, and the third-level drive mode is the drive mode with the highest priority in drive modes indicated by the indication information. If the at least two user-selected drive modes may include the third-level drive mode, the second-level drive mode, and the first-level drive mode, and the first drive mode set includes the fourth-level drive mode, the third-level drive mode, and the second-level drive mode, the management device may determine, through comparison, that the first drive mode set may include the third-level drive mode and the second-level drive mode in the set of the at least two user-selected drive modes. The management device may determine priorities of the third-level drive mode and the second-level drive mode, and determine the third-level drive mode with the highest priority in the third-level drive mode and the second-level drive mode as the target drive mode. If the at least two user-selected drive modes may include the third-level drive mode and the second-level drive mode, and the first drive mode set includes the fifth-level drive mode and the fourth-level drive mode, the management device may determine, through comparison, that the first drive mode set does not include any user-selected drive mode. In this case, the management device may determine the drive mode with the highest priority in the first drive mode set as the target drive mode.

Step 404: The management device sends indication information to the first vehicle control device, where the indication information includes information about the target drive mode.

After the management device determines the target drive mode, the management device may generate the indication information that includes the information about the target drive mode, and send the generated indication information to the first vehicle control device. In an example, the information about the target drive mode may be identification information of the target drive mode and priority information of the target drive mode. When the indication information includes information about only one drive mode (the target drive mode), the target drive mode is the drive mode with the highest priority in drive modes indicated by the indication information.

Further, the management device may establish a communicative connection to the first vehicle control device. When the management device needs to send the indication information to the first vehicle control device, the management device may directly send the indication information to the control device using the communicative connection established between the management device and the first vehicle control device. Optionally, the management device may also establish a communicative connection to the collection device, and the first vehicle control device may also establish a communicative connection to the collection device. The management device may send the indication information to the collection device using the communicative connection established between the management device and the collection device, and then the collection device sends the indication information to the first vehicle control device using the communicative connection established between the collection device and the first vehicle control device.

Optionally, the indication information may alternatively include information about at least two drive modes, the at least two drive modes may include the target drive mode, and the target drive mode is the drive mode with the highest priority in the drive modes indicated by the indication information. In an example, the at least two drive modes may include the third-level drive mode, the second-level drive mode, and the first-level drive mode, where the third-level drive mode with the highest priority is the target drive mode. In the indication information, drive mode information may include drive mode identification information and drive mode priority information. The indication information may be a sequence constituted by the drive mode identification information, and a drive mode sequence is related to a drive mode priority. If the indication information is {3, 2, 1}, it can be learned from the indication information that the priority of the third-level drive mode is higher than the priority of the second-level drive mode, and the priority of the second-level drive mode is higher than the priority of the first-level drive mode. In the three drive modes, the drive mode with the highest priority (the third-level drive mode) is the target drive mode.

Step 405: The first vehicle control device controls the first vehicle to use the target drive mode for driving.

In one aspect, if the indication information includes information about only one drive mode, that is, if the indication information includes the information about only the target drive mode, then after receiving the indication information, the first vehicle control device may extract the information about the target drive mode from the indication information to determine the target drive mode. The first vehicle control device may determine whether the preset drive mode set configured for the first vehicle includes the target drive mode. If the preset drive mode set includes the target drive mode, the first vehicle control device may control the first vehicle to use the target drive mode for driving. If the preset drive mode set does not include the target drive mode, the first vehicle control device may perform no action and does not use the target drive mode for driving.

In another aspect, if the indication information includes information about at least two drive modes, then after receiving the indication information, the first vehicle control device may extract the information about the at least two drive modes from the indication information, and determine a priority of each drive mode in the at least two drive modes based on the drive mode priority information in the information about the at least two drive modes. Then, the first vehicle control device determines the drive mode with the highest priority in the at least two drive modes as the target drive mode, and determines whether the preset drive mode set configured on the first vehicle includes the target drive mode. If the preset drive mode set includes the target drive mode, the first vehicle control device may control the first vehicle to use the target drive mode for driving. If the preset drive mode set does not include the target drive mode, the first vehicle control device may perform no action and does not use the target drive mode for driving.

Because the drive mode indicated by the indication information is a drive mode that the first vehicle is currently allowed to use, and the indication information includes the information about the target drive mode, when the first vehicle is configured with the target drive mode, the first vehicle control device may control the first vehicle to use the target drive mode for driving. That is, the first vehicle control device may control the first vehicle to use the drive mode that the first vehicle is allowed to use in the current scenario and that is configured on the first vehicle, for driving.

In this embodiment of the present disclosure, before the first vehicle travels, the first vehicle control device sends the request information that includes the information about the user-selected drive mode to the management device such that the management device reviews the user-selected drive mode that the first vehicle needs to use, that is, the management device determines whether the first vehicle is allowed to use the user-selected drive mode for driving in the currently located scenario of the first vehicle. If the first vehicle is not allowed to use the user-selected drive mode for driving in the currently located scenario of the first vehicle, the management device may instruct the first vehicle control device to control the first vehicle to use a drive mode that the first vehicle is allowed to use in the current scenario. This ensures that when travelling, the first vehicle uses the drive mode that the first vehicle is allowed to use in the current scenario for driving.

It should be noted that, during a process in which the first vehicle uses a drive mode for driving, if the first vehicle needs to replace the drive mode in use, the first vehicle control device may determine the to-be-replaced drive mode as the user-selected drive mode in step 401, and resend the request information including the information about the user-selected drive mode to the management device, to request the management device to review the user-selected drive mode, that is, to repeat step 401 to step 405. Details are not described herein again in this embodiment of the present disclosure.

Optionally, in step 401, the first vehicle control device may send, to the management device, the request information excluding the information about the user-selected drive mode. To be specific, the request information may be used to request the management device to allocate, to the first vehicle, a drive mode that the first vehicle is allowed to use. In step 402, after the management device receives the request information excluding the information about the user-selected drive mode, the management device may directly determine the first drive mode set, determine the priority of each drive mode in the first drive mode set, determine the drive mode with the highest priority as the target drive mode, and send the indication information including the information about the target drive mode with the highest priority in the first drive mode set to the first vehicle control device, or send the indication information including information about all drive modes in the first drive mode set to the first vehicle control device, where the target drive mode is the drive mode with the highest priority in the drive modes indicated by the indication information.

Optionally, when the first vehicle uses a drive mode for driving, the management device may also determine the drive mode that the first vehicle is allowed to use in the current scenario in real time (or at intervals of a preset time), that is, determine the first drive mode set in real time, and send the indication information including the information about the target drive mode with the highest priority in the first drive mode set to the first vehicle control device in real time (or at intervals of the preset time), or send, to the first vehicle control device, the indication information including the information about all the drive modes in the first drive mode set, where the target drive mode is the drive mode with the highest priority in the drive modes indicated by the indication information. After receiving the indication information including the information about the target drive mode, the first vehicle control device may control the first vehicle to use the target drive mode for driving.

Optionally, the management device may alternatively determine a current drive mode of the first vehicle in real time (or at intervals of the preset time), and determine the first drive mode set including the drive mode that the first vehicle is currently allowed to use. Then, the management device determines whether the first drive mode set includes the current drive mode of the first vehicle. If the first drive mode set does not include the current drive mode of the first vehicle, the management device may determine that the first vehicle is not allowed to use the current drive mode of the first vehicle for driving in the current scenario, determine the drive mode with the highest priority in the first drive mode set as the target drive mode, and send the indication information including the information about the target drive mode to the first vehicle control device, or send, to the first vehicle control device, the indication information including the information about all the drive modes in the first drive mode set, where the target drive mode is the drive mode with the highest priority in the drive modes indicated by the indication information. After receiving the indication information including the information about the target drive mode, the first vehicle control device may control the first vehicle to use the target drive mode for driving.

Further, the first vehicle control device may send, to the management device, first notification information including the information about the current drive mode of the first vehicle in real time (or at intervals of the preset time). Optionally, the management device may alternatively send drive mode enquiry information to the first vehicle control device to request for the current drive mode of the first vehicle. After receiving the drive mode enquiry information, the first vehicle control device may send the first notification information to the management device. After receiving the first notification information, the management device may store the information about the current drive mode of the first vehicle in the first notification information. Optionally, the management device may generate a real-time dynamic diagram of the current drive mode of the first vehicle based on the current drive mode of the first vehicle. When the management device needs to determine the current drive mode of the first vehicle, the management device may query the locally stored information about the current drive mode of the first vehicle in order to determine the current drive mode of the first vehicle.

Further, when the first vehicle uses a drive mode that the first vehicle is allowed to use in the current scenario for driving, the management device may use, based on a different drive mode used by the vehicle, a different method to instruct the first vehicle control device to control the vehicle in order to improve vehicle control efficiency.

In one aspect, the management device may instruct, based on the current drive mode of the vehicle, the first vehicle control device to control the vehicle to change a safe distance between the vehicle and a vehicle ahead or behind. Because the ADS responds faster than the driver, a safe distance from the vehicle ahead or behind corresponding to the zeroth-level drive mode (the non-autonomous drive mode) is greater than a safe distance from the vehicle ahead or behind corresponding to the fifth-level drive mode (the fully autonomous drive mode) in which the ADS is configured. The management device may store a correspondence between a drive mode and a safe distance threshold. If the first vehicle uses the fully autonomous drive mode for driving, because the ADS executes the dynamic driving tasks in the fully autonomous drive mode, the management device may instruct the first vehicle control device to adjust the safe distance between the first vehicle and the vehicle ahead or behind to a safe distance threshold (less than a safe distance threshold corresponding to the non-autonomous drive mode) corresponding to the fully autonomous drive mode. After the safe distance between the first vehicle and the vehicle ahead or behind is adjusted, this effectively improves traffic efficiency under a premise of no traffic accident.

In another aspect, the management device may instruct, based on the current drive mode of the vehicle, the first vehicle control device to control the vehicle to change a speed of the vehicle. In an example, a different drive mode corresponds to a different speed threshold. The management device may store a correspondence between a drive mode and a speed threshold. When a driving speed of a vehicle is greater than a speed threshold corresponding to a current drive mode of the vehicle, a probability of a traffic accident for the vehicle is relatively high. When the management device determines that the drive mode used by the first vehicle is a drive mode W, the management device may instruct the first vehicle control device to control the first vehicle to change the speed based on the drive mode W.

Further, if the drive mode W is the zeroth-level drive mode (namely the non-autonomous drive mode), the management device may inform the first vehicle control device of a speed threshold corresponding to the drive mode W. The management device may further determine a driving speed of the first vehicle. When the driving speed of the first vehicle is greater than the speed threshold corresponding to the drive mode W, the management device may instruct the first vehicle control device to send a warning to the driver of the first vehicle, to remind the driver to reduce the driving speed. In an example, the first vehicle control device may send the warning to the driver of the first vehicle in a voice or image display manner.

If the drive mode W is the first-level drive mode (namely the driver-aided drive mode) or the second-level drive mode (namely the partially autonomous drive mode), the management device may inform the first vehicle control device of the speed threshold corresponding to the drive mode W. A DAS is disposed on a vehicle configured with the first-level drive mode or the second-level drive mode. In an example, the DAS may be integrated into the first vehicle control device. The management device may further determine the driving speed of the first vehicle. When the driving speed of the first vehicle is greater than the speed threshold corresponding to the drive mode W, the management device may instruct the first vehicle control device to send a warning to the driver of the first vehicle in the voice or image display manner to remind the driver to reduce the driving speed. If the DAS disposed on the first vehicle has a function of controlling a vehicle driving speed, the management device may instruct the first vehicle control device to reduce the driving speed by controlling the DAS. Optionally, when the management device informs the first vehicle control device of the speed threshold corresponding to the drive mode W, the first vehicle control device may store the speed threshold corresponding to the drive mode W, monitor the driving speed of the first vehicle in real time, and when the driving speed of the first vehicle is greater than the stored speed threshold, control the first vehicle to reduce the driving speed.

If the drive mode W is the third-level drive mode (namely the conditionally autonomous drive mode), the fourth-level drive mode (namely the highly autonomous drive mode), or the fifth-level drive mode (namely the fully autonomous drive mode), the management device may inform the first vehicle control device of the speed threshold corresponding to the drive mode W. An ADS is disposed on a vehicle configured with the third-level drive mode, the fourth-level drive mode, or the fifth-level drive mode. In an example, the ADS may be integrated into the first vehicle control device. The management device may further determine the driving speed of the first vehicle. When the driving speed of the first vehicle is greater than the speed threshold corresponding to the drive mode W, the management device may instruct the first vehicle control device to control the first vehicle to reduce the driving speed by controlling the ADS. Optionally, when the management device informs the first vehicle control device of the speed threshold corresponding to the drive mode W, the first vehicle control device may store the speed threshold corresponding to the drive mode W, monitor the driving speed of the first vehicle in real time, and when the driving speed of the first vehicle is greater than the stored speed threshold, control the first vehicle to reduce the driving speed.

In an embodiment, a second vehicle control device in the ITS may also report a current drive mode of a second vehicle to the management device in real time such that the management device can determine the current drive mode of the second vehicle in the ITS. After the management device determines the current drive mode of the second vehicle, the management device may send second notification information including information about the current drive mode of the second vehicle to the first vehicle control device, to inform the first vehicle control device of the current drive mode of the second vehicle. The information about the current drive mode of the second vehicle may include identification information of the current drive mode of the second vehicle. The management device may also inform the second vehicle control device of the current drive mode of the first vehicle. Optionally, the first vehicle control device and the second vehicle control device may communicate with each other to inform each other of the current drive mode of the first vehicle and the current drive mode of the second vehicle, respectively. Further, the first vehicle control device may alternatively request the management device for the current drive mode of the second vehicle such that the management device informs the first vehicle control device of the current drive mode of the second vehicle, or the first vehicle control device requests the second vehicle control device for the current drive mode of the second vehicle such that the second vehicle control device informs the first vehicle control device of the current drive mode of the second vehicle.

After the first vehicle control device determines the current drive mode of the second vehicle, the first vehicle control device may establish a real-time dynamic diagram of the drive mode of the second vehicle. When the second vehicle and the first vehicle travel in a same lane, and the second vehicle is in front of the first vehicle, if the first vehicle needs to overtake the second vehicle, and a drive mode used by the second vehicle is the zeroth-level drive mode (namely the non-autonomous drive mode), the first vehicle control device may control the first vehicle to inform a driver of the second vehicle of an overtaking attempt of the first vehicle in a manner of showing vehicle lights or sounding a warning. If the drive mode used by the second vehicle is the fifth-level drive mode (namely the fully autonomous drive mode), the first vehicle control device may send, to the ADS on the second vehicle, overtaking information indicating that the first vehicle needs to overtake, to inform the second vehicle of the overtaking attempt of the first vehicle. Optionally, the first vehicle control device may alternatively send the overtaking information to the management device, and the management device sends the overtaking information to the ADS on the second vehicle in order to inform the second vehicle of the overtaking attempt of the first vehicle. The first vehicle control device may determine, based on the drive mode of the second vehicle, a manner of informing the second vehicle of the overtaking attempt of the first vehicle in order to ensure that the first vehicle effectively informs the second vehicle of the overtaking attempt. This improves overtaking efficiency and avoids a traffic accident.

In a related technology, a vehicle is configured with a drive mode, and the drive mode may be corresponding to at least one allowable scenario. The management device in the ITS merely performs effective control over the vehicle when the vehicle uses a drive mode that is allowed to use in a current scenario for driving. Therefore, a control function of the ITS is relatively monotonous and the vehicle control flexibility is relatively low. In this embodiment of the present disclosure, when the first vehicle travels, the management device may determine the first drive mode set including the driving mode that the first vehicle is allowed to use in the currently located scenario of the first vehicle, determine the target drive mode in the first drive mode set, and then send, to the first vehicle control device, the indication information including the information about the target drive mode, that is, instruct the first vehicle control device to control the first vehicle to use the target drive mode for driving such that the drive mode used by the first vehicle in the ITS is the drive mode that the first vehicle is allowed to use in the current scenario. Therefore, the management device in the ITS can perform effective control over the first vehicle.

To sum up, according to the vehicle control method provided in this embodiment of the present disclosure, the management device first obtains the first drive mode set including the drive mode that the first vehicle is currently allowed to use, determines the target drive mode in the first drive mode set, and then sends, to the first vehicle control device, the indication information including the information about the target drive mode such that the first vehicle control device, after receiving the indication information, controls the first vehicle to use the target drive mode for driving. In addition, the target drive mode is the drive mode that the first vehicle is currently allowed to use. Therefore, this ensures that a drive mode used by the first vehicle is the drive mode that the first vehicle is currently allowed to use, and the management device can perform effective control over the first vehicle. This enriches a control function of a vehicle control system and improves vehicle control flexibility.

Figure 5A:
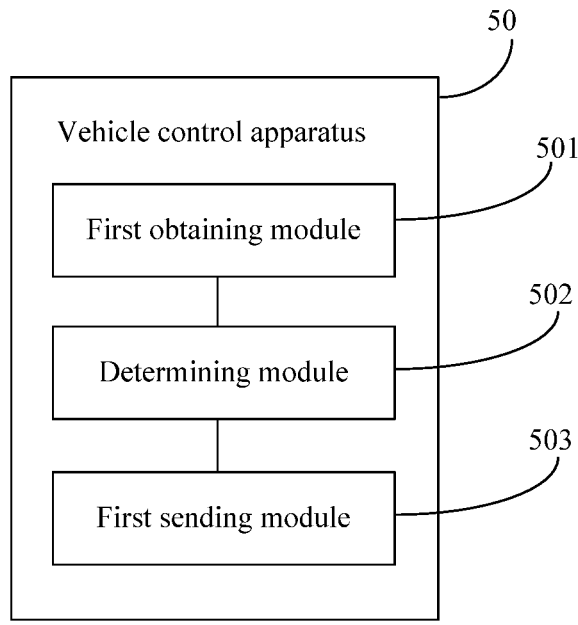
FIG. 5A is a schematic structural diagram of a vehicle control apparatus according to an embodiment of the present disclosure.

As shown in FIG. 5A, an embodiment of the present disclosure provides a vehicle control apparatus 50, and the vehicle control apparatus 50 may be the management device 01 in the ITS 100 shown in FIG. 1. The vehicle control apparatus 50 may include a first obtaining module 501 configured to obtain a first drive mode set, where the first drive mode set includes a drive mode that a first vehicle is currently allowed to use, a determining module 502 configured to determine a target drive mode in the first drive mode set obtained by the first obtaining module, and a first sending module 503 configured to send indication information to a first vehicle control device, where the indication information includes information about the target drive mode determined by the determining module 502, and the indication information is used to instruct the first vehicle control device to control the first vehicle to use the target drive mode for driving.

To sum up, according to the vehicle control apparatus 50 provided in this embodiment of the present disclosure, the first obtaining module 501 first obtains the first drive mode set including the drive mode that the first vehicle is currently allowed to use, the determining module 502 determines the target drive mode in the first drive mode set, and then the first sending module 503 sends, to the first vehicle control device, the indication information including the information about the target drive mode such that the first vehicle control device, after receiving the indication information, controls the first vehicle to use the target drive mode for driving. In addition, the target drive mode is the drive mode that the first vehicle is currently allowed to use. Therefore, this ensures that a drive mode used by the first vehicle is the drive mode that the first vehicle is currently allowed to use, and the management device can perform effective control over the first vehicle. This enriches a control function of a vehicle control system and improves vehicle control flexibility.

Optionally, the management device stores a correspondence between a drive mode and a priority, and the determining module 502 may be further configured to determine a priority of a drive mode in the first drive mode set obtained by the first obtaining module 501 based on the correspondence between a drive mode and a priority, and determine a drive mode with a highest priority in drive modes of the first drive mode set as the target drive mode.

Optionally, the first sending module 503 may be further configured to send the indication information to the first vehicle control device, where the indication information includes information about only one drive mode and the one drive mode is the target drive mode determined by the determining module 502, or send the indication information to the first vehicle control device, where the indication information includes information about at least two drive modes in the first drive mode set obtained by the first obtaining module 501, drive mode information includes drive mode priority information, and the target drive mode determined by the determining module 502 is a drive mode with a highest priority in the at least two drive modes.

Optionally, the first obtaining module 501 may be further configured to receive request information sent by the first vehicle control device, where the request information is used to request for a drive mode that the first vehicle is allowed to use, determine a currently located scenario of the first vehicle based on the request information, obtain the drive mode that the first vehicle is allowed to use in the currently located scenario, and determine the first drive mode set based on the drive mode that the first vehicle is allowed to use in the currently located scenario.

Optionally, the request information includes information about a user-selected drive mode, the request information is used for requesting to use the user-selected drive mode for driving, the first vehicle is configured with a preset drive mode set, the preset drive mode set includes at least one drive mode, and the user-selected drive mode belongs to the preset drive mode set, and the determining module 502 may be further configured to determine whether the first drive mode set obtained by the first obtaining module includes the user-selected drive mode, determine the user-selected drive mode as the target drive mode when the first drive mode set includes the user-selected drive mode, and determine a priority of each drive mode in the first drive mode set based on the correspondence between a drive mode and a priority, and determine the drive mode with the highest priority in the first drive mode set as the target drive mode when the first drive mode set does not include the user-selected drive mode.

Optionally, the management device stores a correspondence between a drive mode and a priority, and the determining module 502 may be further configured to obtain a current drive mode of the first vehicle, determine whether the first drive mode set obtained by the first obtaining module 501 includes the current drive mode of the first vehicle, and determine a priority of each drive mode in the first drive mode set based on the correspondence between a drive mode and a priority, and determine the drive mode with the highest priority in the first drive mode set as the target drive mode when the first drive mode set does not include the current drive mode of the first vehicle.

Figure 5B:
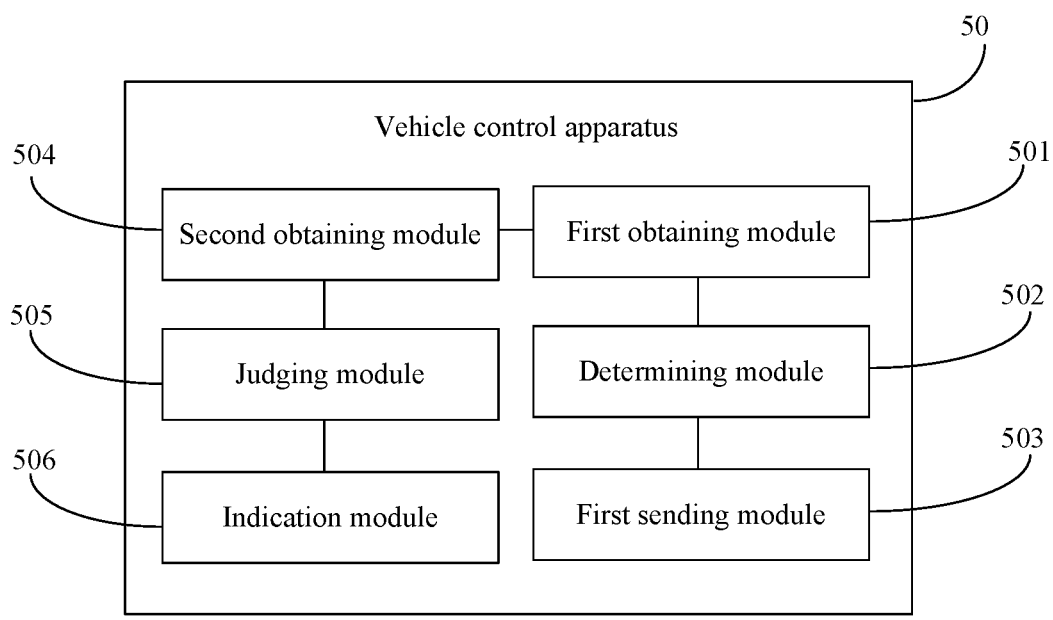
FIG. 5B is a schematic structural diagram of another vehicle control apparatus according to an embodiment of the present disclosure.

Optionally, as shown in FIG. 5B, an embodiment of the present disclosure provides another vehicle control apparatus 50. The vehicle control apparatus 50 stores a correspondence between a drive mode and a safe distance threshold, and a correspondence between a drive mode and a speed threshold. On a basis of FIG. 5A, the vehicle control apparatus 50 may further include a second obtaining module 504 configured to obtain a current drive mode of the first vehicle, a judging module 505 configured to determine whether the first drive mode set obtained by the first obtaining module 501 includes the current drive mode of the first vehicle, and an indication module 506 configured to instruct, based on the current drive mode of the first vehicle and the correspondence between a drive mode and a safe distance threshold, the first vehicle control device to control the first vehicle to adjust a safe distance between the first vehicle and a vehicle ahead or behind when the first drive mode set includes the current drive mode of the first vehicle, where an adjusted safe distance between the first vehicle and the vehicle ahead or behind is greater than or equal to a safe distance threshold corresponding to the current drive mode of the first vehicle, or instruct, based on the current drive mode of the first vehicle and the correspondence between a drive mode and a speed threshold, the first vehicle control device to control the first vehicle to adjust a driving speed of the first vehicle when the first drive mode set includes the current drive mode of the first vehicle, where an adjusted driving speed of the first vehicle is less than or equal to a speed threshold corresponding to the current drive mode of the first vehicle.

Optionally, the second obtaining module 504 may be further configured to receive first notification information sent by the first vehicle control device, where the first notification information includes information about the current drive mode of the first vehicle, and determine the current drive mode of the first vehicle based on the first notification information.

Figure 5C:
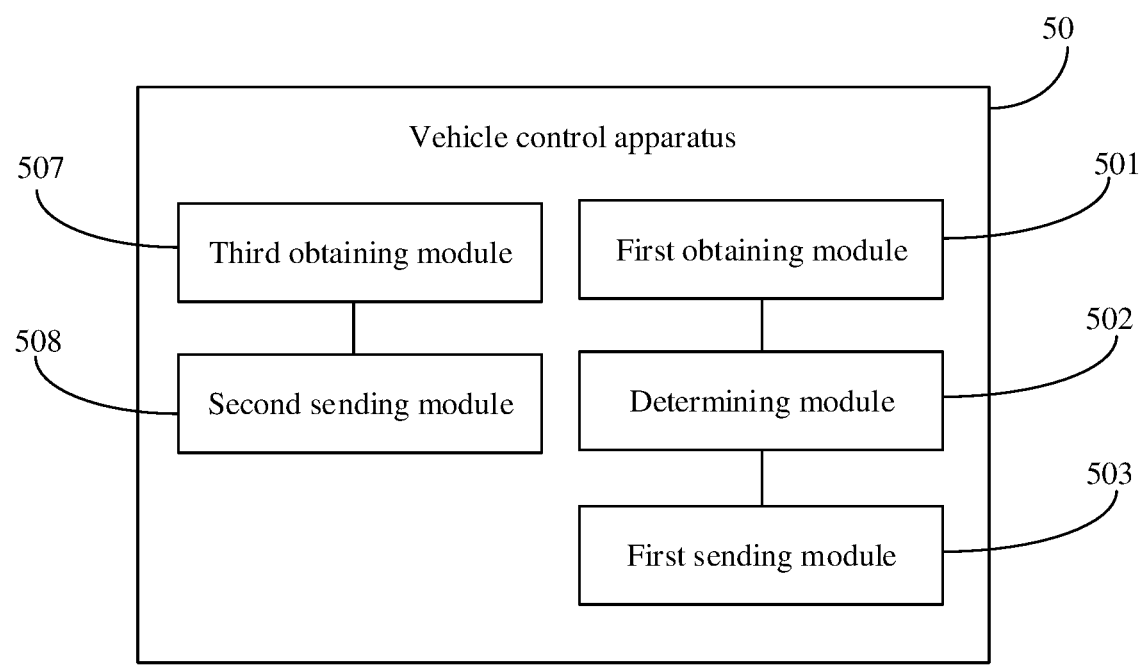
FIG. 5C is a schematic structural diagram of still another vehicle control apparatus according to an embodiment of the present disclosure.

Optionally, as shown in FIG. 5C, an embodiment of the present disclosure provides still another vehicle control apparatus 50. On a basis of FIG. 5A, the vehicle control apparatus 50 may further include a third obtaining module 507 configured to obtain a current drive mode of a second vehicle, where a distance between the first vehicle and the second vehicle is less than a preset distance, and a second sending module 508 configured to send second notification information to the first vehicle control device, where the second notification information includes information about the current drive mode of the second vehicle.

To sum up, according to the vehicle control apparatus 50 provided in this embodiment of the present disclosure, the first obtaining module 501 first obtains the first drive mode set including the drive mode that the first vehicle is currently allowed to use, the determining module 502 determines the target drive mode in the first drive mode set, and then the first sending module 503 sends, to the first vehicle control device, the indication information including the information about the target drive mode such that the first vehicle control device, after receiving the indication information, controls the first vehicle to use the target drive mode for driving. In addition, the target drive mode is the drive mode that the first vehicle is currently allowed to use. Therefore, this ensures that a drive mode used by the first vehicle is the drive mode that the first vehicle is currently allowed to use, and the management device can perform effective control over the first vehicle. This enriches a control function of a vehicle control system and improves vehicle control flexibility.

Figure 6:
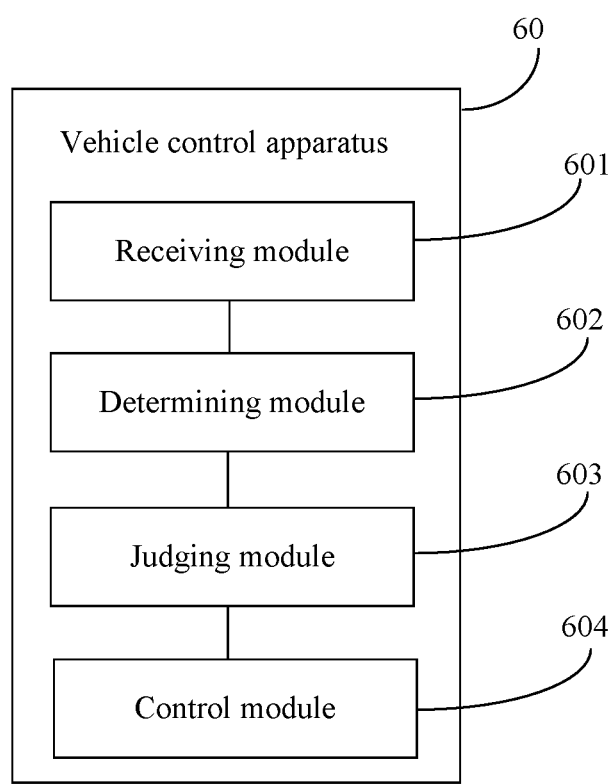
FIG. 6 is a schematic structural diagram of yet another vehicle control apparatus according to an embodiment of the present disclosure.

As shown in FIG. 6, an embodiment of the present disclosure provides yet another vehicle control apparatus 60, and the vehicle control apparatus 60 may be the first vehicle control device 03 in the ITS 100 shown in FIG. 1. The vehicle control apparatus 60 may include a receiving module 601 configured to receive indication information sent by a management device, where the indication information includes information about at least two drive modes, drive mode information includes drive mode priority information, and the at least two drive modes are drive modes that a first vehicle is currently allowed to use, a determining module 602 configured to determine, based on priority information of the at least two drive modes in the indication information received by the receiving module, a drive mode with a highest priority in the at least two drive modes as a target drive mode, a judging module 603 configured to determine whether a preset drive mode set includes the target drive mode determined by the determining module 602, where the first vehicle is configured with the preset drive mode set, and the preset drive mode set includes at least one drive mode, and a control module 604 configured to, when the judging module 603 determines that the preset drive mode set includes the target drive mode, control the first vehicle to use the target drive mode for driving.

To sum up, according to the vehicle control apparatus 60 provided in this embodiment of the present disclosure, the indication information sent by the management device and received by the receiving module 601 includes the information about the at least two drive modes, and the at least two drive modes are drive modes that the first vehicle is currently allowed to use. Therefore, the determining module 602 may determine a drive mode in the at least two drive modes as the target drive mode, and the judging module 603 may determine whether the first vehicle is configured with the target drive mode. If the first vehicle is configured with the target drive mode, the control module 604 controls the first vehicle to use the target drive mode for driving. In addition, the target drive mode is the drive mode that the first vehicle is currently allowed to use. Therefore, this ensures that a drive mode used by the first vehicle is the drive mode that the first vehicle is currently allowed to use, and the management device can perform effective control over the first vehicle. This enriches a control function of a vehicle control system and improves vehicle control flexibility.

An embodiment of the present disclosure provides a vehicle control system, and the vehicle control system may include a management device and a first vehicle control device. The management device may include the vehicle control apparatus 50 shown in FIG. 5A, FIG. 5B, or FIG. 5C, and the first vehicle control device may include the vehicle control apparatus 60 shown in FIG. 6.

To sum up, in the vehicle control system provided in this embodiment of the present disclosure, the management device first obtains a first drive mode set including a drive mode that a first vehicle is currently allowed to use, determines a target drive mode in the first drive mode set, and then sends, to the first vehicle control device, indication information including information about the target drive mode such that the first vehicle control device, after receiving the indication information, controls the first vehicle to use the target drive mode for driving. In addition, the target drive mode is the drive mode that the first vehicle is currently allowed to use. Therefore, this ensures that a drive mode used by the first vehicle is the drive mode that the first vehicle is currently allowed to use, and the management device can perform effective control over the first vehicle. This enriches a control function of the vehicle control system and improves vehicle control flexibility.

Figure 7:
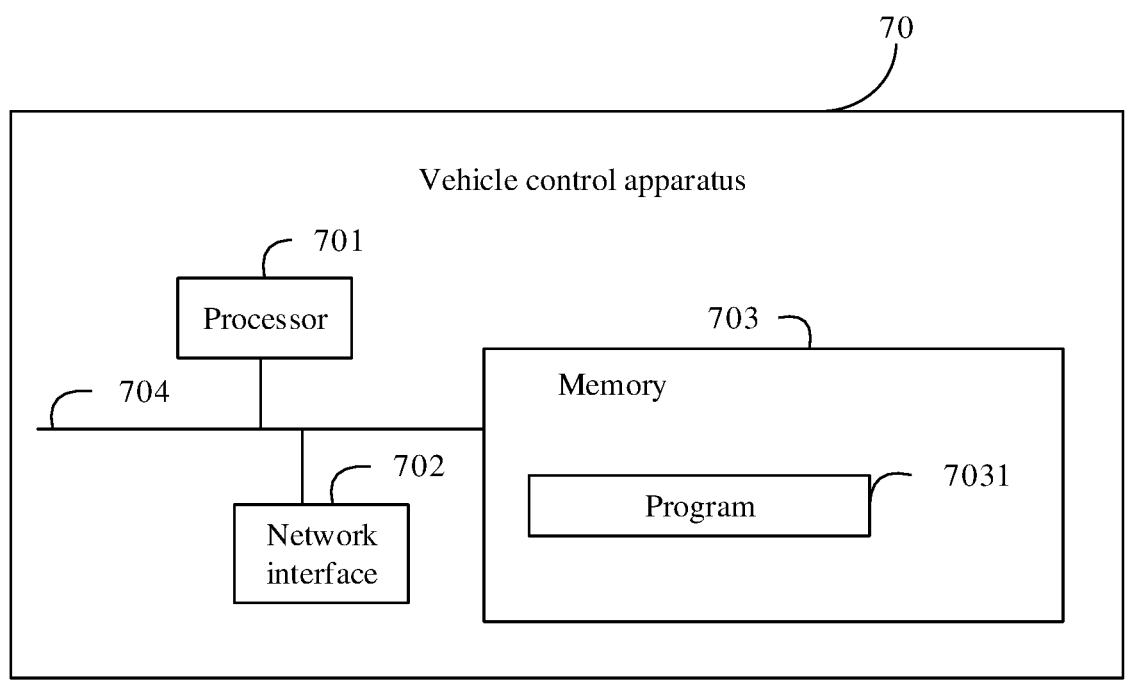
FIG. 7 is a schematic structural diagram of a vehicle control apparatus according to another embodiment of the present disclosure.

As shown in FIG. 7, another embodiment of the present disclosure provides a vehicle control apparatus 70, and the vehicle control apparatus 70 may be the management device 01 in the ITS 100 shown in FIG. 1. The vehicle control apparatus 70 includes at least one processor 701 (for example, a central processing unit (CPU)), at least one network interface 702 or another communications interface, a memory 703, and at least one communications bus 704 configured to implement a communicative connection between these apparatuses. The processor 701 is configured to execute an executable module, such as a computer program, stored in the memory 703. The memory 703 may include a high-speed random access memory (RAM), or may further include a non-volatile memory such as at least one magnetic disk memory. The vehicle control apparatus 70 is communicatively connected to at least one of other network elements through the at least one network interface 702 (which may be wired or wireless) using the Internet, a wide area network, a local network, a metropolitan area network, or the like.

In some implementations, a program 7031 is stored in the memory 703. The program 7031 may be executed by the processor 701 to implement the method in the embodiment shown in FIG. 2.

The vehicle control apparatus 70 provided in this embodiment of the present disclosure can implement, through cooperation between the foregoing execution modules, the method embodiment shown in FIG. 2 and the apparatus embodiments shown in FIG. 5A, FIG. 5B, and FIG. 5C. In an example, the first obtaining module 501 in FIG. 5A, the determining module 502 in FIG. 5A, the second obtaining module 504 in FIG. 5B, the judging module 505 in FIG. 5B, the indication module 506 in FIG. 5B, and the third obtaining module 507 in FIG. 5C may be implemented by the processor 701 by executing the program 7031 stored in the memory 703. The first sending module 503 in FIG. 5A and the second sending module 508 in FIG. 5C may be implemented by the network interface 702.

To sum up, the vehicle control apparatus 70 provided in this embodiment of the present disclosure first obtains a first drive mode set including a drive mode that a first vehicle is currently allowed to use, determines a target drive mode in the first drive mode set, and then sends, to a first vehicle control device, indication information including information about the target drive mode such that the first vehicle control device, after receiving the indication information, controls the first vehicle to use the target drive mode for driving. In addition, the target drive mode is the drive mode that the first vehicle is currently allowed to use. Therefore, this ensures that a drive mode used by the first vehicle is the drive mode that the first vehicle is currently allowed to use, and the management device can perform effective control over the first vehicle. This enriches a control function of a vehicle control system and improves vehicle control flexibility.

Figure 8:
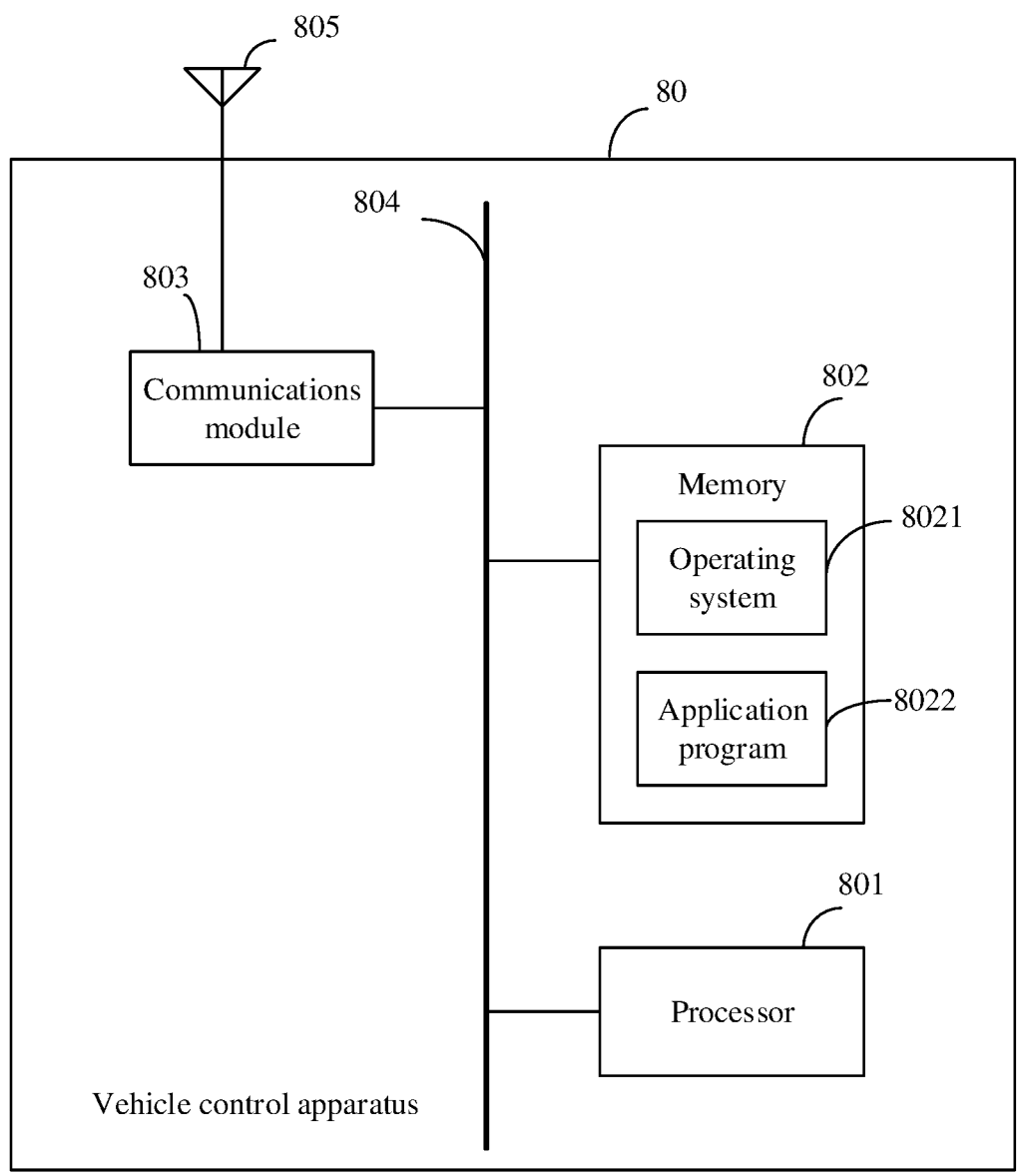
FIG. 8 is a schematic structural diagram of another vehicle control apparatus according to another embodiment of the present disclosure.

As shown in FIG. 8, another embodiment of the present disclosure provides another vehicle control apparatus 80, and the vehicle control apparatus 80 may be the first vehicle control device 03 in the ITS 100 shown in FIG. 1. It should be understood that a vehicle control apparatus in an embodiment may have more or fewer components than the vehicle control apparatus 80 shown in FIG. 8, may combine two or more components, or may have a different component configuration. Various components shown in FIG. 8 may be implemented using hardware, software, or a combination of hardware and software including one or more signal processors and/or application-specific integrated circuits. Herein, the vehicle control apparatus 80 shown in FIG. 8 is used as an example for specific description. As shown in FIG. 8, the vehicle control apparatus 80 includes at least one processor 801, a memory 802, a communications module 803, at least one communications bus 804, and a communications antenna 805. The vehicle control apparatus 80 further includes another functional component such as a battery module and a wired/wireless charging structure (not shown). The communications bus 804 is configured to implement a communicative connection between these components. The memory 802 may include a non-volatile solid state memory and/or a dynamic non-volatile storage device, such as a flash memory and a rotatable disk driver. The communications module 803 may be configured to perform long-distance communication, such as Global System for Mobile communications (GSM), Code Division Multiple Access (CDMA), General Packet Radio Service (GPRS), Enhanced Data Rate for GSM Evolution (EDGE), a third generation (3G) technology such as Wideband CDMA (WCDMA) and Time Division-Synchronous CDMA (TD-SCDMA), and a fourth generation (4G) technology such as long term evolution (LTE). The communications antenna 805 is configured to send and receive a communications signal.

Further, the memory 802 includes an operating system 8021 and an application program 8022, where the operating system 8021 includes various operating system programs used for implementing various hardware-based operations, and the application program 8022 includes various application programs used for implementing various application functions. The processor 801 communicates with various modules and components using the communications bus 804, and the processor 801 may execute an application program stored in the memory 802 to implement the vehicle control method shown in FIG. 3.

The vehicle control apparatus 80 provided in this embodiment of the present disclosure can implement, through cooperation between the foregoing execution modules, the method embodiment shown in FIG. 3 and the apparatus embodiment shown in FIG. 6. In an example, the receiving module 601 in FIG. 6 may be implemented by the communications module 803 and the communications antenna 805, the determining module 602 in FIG. 6, the judging module 603 in FIG. 6, and the control module 604 in FIG. 6 may be implemented by the processor 801 by executing the application program stored in the memory 802.

To sum up, indication information sent by a management device and received by the vehicle control apparatus 80 provided in this embodiment of the present disclosure includes information about at least two drive modes, and the at least two drive modes are drive modes that a first vehicle is currently allowed to use. Therefore, a drive mode in the at least two drive modes may be determined as a target drive mode, and it is determined whether the first vehicle is configured with the target drive mode. If the first vehicle is configured with the target drive mode, the first vehicle is controlled to use the target drive mode for driving. In addition, the target drive mode is a drive mode that the first vehicle is currently allowed to use. Therefore, this ensures that a drive mode used by the first vehicle is the drive mode that the first vehicle is currently allowed to use, and the management device can perform effective control over the first vehicle. This enriches a control function of a vehicle control system and improves vehicle control flexibility.

An embodiment of the present disclosure provides another vehicle control system, and the vehicle control system includes a management device and a first vehicle control device. The management device may include the vehicle control apparatus 70 shown in FIG. 7, and the first vehicle control device may include the vehicle control apparatus 80 shown in FIG. 8.

To sum up, in the vehicle control system provided in this embodiment of the present disclosure, the management device first obtains a first drive mode set including a drive mode that a first vehicle is currently allowed to use, determines a target drive mode in the first drive mode set, and then sends, to the first vehicle control device, indication information including information about the target drive mode such that the first vehicle control device, after receiving the indication information, controls the first vehicle to use the target drive mode for driving. In addition, the target drive mode is the drive mode that the first vehicle is currently allowed to use. Therefore, this ensures that a drive mode used by the first vehicle is the drive mode that the first vehicle is currently allowed to use, and the management device can perform effective control over the first vehicle. This enriches a control function of the vehicle control system and improves vehicle control flexibility.

It should be noted that a chronological order of steps of the vehicle control method provided in the embodiments of the present disclosure may be properly adjusted, and the steps may also be correspondingly added or deleted based on a requirement. Any variation readily figured out by persons skilled in the art within the technical scope disclosed in the present disclosure shall fall within the protection scope of the present disclosure, and details are not described herein again.

Persons skilled in the art may clearly understand that, for ease and brevity of description, for a detailed working process of the foregoing vehicle control apparatus and vehicle control system, reference may be made to a corresponding process in the foregoing vehicle control method embodiments, and details are not described herein again.

The foregoing descriptions are merely example embodiments of the present disclosure, but are not intended to limit the present disclosure. Any modification, equivalent replacement, or improvement made without departing from the spirit and principle of the present disclosure should fall within the protection scope of the present disclosure.

What is claimed is:

1. A vehicle control method for controlling a vehicle in an intelligent transportation system (ITS) comprising a management device, the vehicle, and a vehicle control device disposed on the vehicle, wherein the management device and the vehicle control device are adapted to communicate with each other, and wherein the method comprises:

obtaining, by the management device, a drive mode set comprising drive modes including a drive mode that the vehicle is currently allowed to use, wherein the drive mode set comprises a non-autonomous drive mode, a driver-aided drive mode, a partially autonomous drive mode, a conditionally autonomous drive mode, a highly autonomous drive mode, and a fully autonomous drive mode;

selecting, by the management device, a target drive mode from the drive mode set by:
   determining, based on a correspondence between a drive mode and a priority, a priority of each drive mode in the drive mode set, wherein the correspondence is stored in management device; and
   setting, by the management device, a drive mode with a highest priority of the drive mode set as the target drive mode; and sending, by the management device, indication information to the vehicle control device, wherein the indication information comprises information about the target drive mode, and wherein the indication information instructs the vehicle control device to control the vehicle to use the target drive mode for driving.

2. The method of claim 1, wherein sending the indication information to the first vehicle control device comprises sending, by the management device, the indication information to the first vehicle control device, wherein the indication information comprises information about a one drive mode, and wherein the one drive mode comprises the target drive mode.

3. The method of claim 1, wherein sending the indication information to the first vehicle control device comprises sending, by the management device, the indication information to the first vehicle control device, wherein the indication information comprises information about at least two drive modes in the drive mode set, drive mode information comprising drive mode priority information, and the target drive mode comprising a drive mode with a highest priority in the at least two drive modes.

4. The method of claim 1, wherein obtaining the drive mode set comprises:
   receiving, by the management device, request information from the vehicle control device, wherein the request information requests for a drive mode that the vehicle is allowed to use;
   determining, by the management device, a currently located scenario of the vehicle based on the request information;
   obtaining, by the management device, the drive mode that the vehicle is allowed to use in the currently located scenario; and
   determining, by the management device, the drive mode set based on the drive mode that the vehicle is allowed to use in the currently located scenario.

5. The method of claim 1, wherein selecting the target drive mode from the drive mode set further comprises:
   obtaining, by the management device, a user-selected drive mode from the vehicle control device, wherein the vehicle is configured with a preset drive mode set, wherein the preset drive mode set comprises at least one drive mode, and wherein the user-selected drive mode belongs to the preset drive mode set;
   determining, by the management device, whether the first drive mode set comprises the user-selected drive mode;
   setting, by the management device, the user-selected drive mode as the target drive mode when the drive mode set comprises the user-selected drive mode; and
   setting the drive mode with the highest priority in the drive mode set as the target drive mode when the drive mode set does not comprise the user-selected drive mode.

6. The method of claim 1, wherein selecting the target drive mode from the drive mode set further comprises:
   obtaining, by the management device, a current drive mode of the vehicle;
   determining, by the management device, whether the drive mode set comprises the current drive mode of the vehicle;
   and
   setting the drive mode with the highest priority in the drive mode set as the target drive mode when the drive mode set does not comprise the current drive mode of the vehicle.

7. The method of claim 1, further comprising:
   obtaining, by the management device, a current drive mode of the vehicle;
   determining, by the management device, whether the drive mode set comprises the current drive mode of the vehicle; and
   instructing, by the management device based on the current drive mode of the vehicle and a correspondence between a drive mode and a safe distance threshold stored in the management device, the vehicle control device to control the vehicle to adjust a safe distance between the vehicle and a vehicle ahead or behind when the drive mode set comprises the current drive mode of the vehicle, wherein the adjusted safe distance between the vehicle and the vehicle ahead or behind is greater than or equal to a safe distance threshold corresponding to the current drive mode of the vehicle.

8. The method of claim 1, further comprising:
   obtaining, by the management device, a current drive mode of the vehicle;
   determining, by the management device, whether the drive mode set comprises the current drive mode of the vehicle; and
   instructing, by the management device based on the current drive mode of the vehicle and a correspondence between a drive mode and a speed threshold stored in the management device, the vehicle control device to control the vehicle to adjust a driving speed of the vehicle when the drive mode set comprises the current drive mode of the vehicle, wherein the adjusted driving speed of the vehicle is less than or equal to a speed threshold corresponding to the current drive mode of the vehicle.

9. The method of claim 1, wherein the non-autonomous drive mode is a zeroth-level drive mode, wherein the fully autonomous drive mode is a fifth-level drive mode, and wherein a priority of the fifth-level drive mode is higher than a priority of the zeroth-level drive mode.

10. A management device for controlling a vehicle in an intelligent transportation system (ITS) comprising the management device, the vehicle, and a vehicle control device on the vehicle, wherein the management device and the vehicle control device are adapted to communicate with each other, and wherein the management device comprises:
   a non-transitory computer-readable storage medium configured to store programming instructions;
   a processor coupled to the non-transitory computer-readable storage medium, wherein the programming instructions cause the processor to be configured to:
      obtain a drive mode set comprising a drive mode that the vehicle is currently allowed to use, wherein the drive mode set comprises a non-autonomous drive mode, a driver-aided drive mode, a partially autonomous drive mode, a conditionally autonomous drive mode, a highly autonomous drive mode, and a fully autonomous drive mode; and
      determine a target drive mode in the drive mode set, wherein in a manner to determine the target drive mode, the processor is further configured to:
         determine, based on a correspondence between a drive mode and a priority, a priority of each drive mode in the drive mode set, wherein the correspondence is stored in management device; and
         set, by the management device, a drive mode with a highest priority of the drive mode set as the target drive mode; and
   a transmitter coupled to the non-transitory computer-readable storage medium and the processor, and configured to send indication information to the vehicle control device, wherein the indication information comprises information about the target drive mode, and instructs the vehicle control device to control the vehicle to use the target drive mode for driving.

11. The management device of claim 10, wherein the transmitter is further configured to send the indication information to the vehicle control device, wherein the indication information comprises information about a one drive mode, and wherein the one drive mode comprises the target drive mode.

12. The management device of claim 10, wherein the transmitter is further configured to send the indication information to the vehicle control device, and wherein the indication information comprises information about at least two drive modes in the drive mode set, drive mode information comprising drive mode priority information, and the target drive mode comprising a drive mode with a highest priority in the at least two drive modes.

13. The management device of claim 10, further comprising a receiver coupled to the non-transitory computer-readable storage medium, the processor, and the transmitter, and configured to receive request information from the vehicle control device, wherein the request information requests for the drive mode that the vehicle is allowed to use, and wherein the programming instructions further cause the processor to be configured to:
    determine a currently located scenario of the vehicle based on the request information;
    obtain the drive mode that the vehicle is allowed to use in the currently located scenario; and
    determine the first drive mode set based on the drive mode that the vehicle is allowed to use in the currently located scenario.

14. The management device of claim 10, wherein the programming instructions further cause the processor to be configured to:
    obtain a user-selected drive mode from the vehicle control device, wherein the vehicle is configured with a preset drive mode set, wherein the preset drive mode set comprises at least one drive mode, and wherein the user-selected drive mode belongs to the preset drive mode set;
    determine whether the drive mode set comprises the user-selected drive mode;
    set the user-selected drive mode as the target drive mode when the drive mode set comprises the user-selected drive mode; and
    set a drive mode with the highest priority in the drive mode set as the target drive mode when the drive mode set does not comprise the user-selected drive mode.

15. The management device of claim 10, wherein the programming instructions further cause the processor to be configured to:
    obtain a current drive mode of the vehicle;
    determine whether the drive mode set comprises the current drive mode of the vehicle; and
    set a drive mode with a highest priority in the drive mode set as the target drive mode when the drive mode set does not comprise the current drive mode of the vehicle.

16. The management device of claim 10, wherein the programming instructions further cause the processor to be configured to:
    obtain a current drive mode of the vehicle;
    determine whether the drive mode set comprises the current drive mode of the vehicle; and
    instruct, based on the current drive mode of the vehicle and a correspondence between a drive mode and a safe distance threshold stored in the vehicle control apparatus, the vehicle control device to control the vehicle to adjust a safe distance between the vehicle and a vehicle ahead or behind when the drive mode set comprises the current drive mode of the vehicle, wherein the adjusted safe distance between the vehicle and the vehicle ahead or behind is greater than or equal to a safe distance threshold corresponding to the current drive mode of the vehicle.

17. The management device of claim 10, wherein the programming instructions further cause the processor to be configured to:
    obtain a current drive mode of the vehicle;
    determine whether the drive mode set comprises the current drive mode of the vehicle; and
    instruct, based on the current drive mode of the vehicle and a correspondence between a drive mode and a speed threshold stored in the vehicle control apparatus, the vehicle control device to control the vehicle to adjust a driving speed of the vehicle when the drive mode set comprises the current drive mode of the vehicle, wherein the adjusted driving speed of the vehicle is less than or equal to a speed threshold corresponding to the current drive mode of the vehicle.

18. A management device for controlling a vehicle in an intelligent transportation system (ITS) comprising the management device, the vehicle, and a vehicle control device on the vehicle, wherein the management device and the vehicle control device are adapted to communicate with each other, and wherein the management device comprises:
    a receiver configured to receive indication information from the management device, wherein the indication information comprises information about at least two drive modes, drive mode information comprising drive mode priority information, and the at least two drive modes comprising drive modes that a vehicle is currently allowed to use;
    a non-transitory computer-readable storage medium configured to store programming instructions; and
    at least one processor coupled to the non-transitory computer-readable storage medium and the receiver, wherein the programming instructions cause the at least one processor to be configured to:
        set, based on priority information of the at least two drive modes in the indication information received by the receiver, a drive mode with a highest priority in the at least two drive modes as a target drive mode;
        determine whether a preset drive mode set comprises the target drive mode, wherein the vehicle is configured with the preset drive mode set, wherein the preset drive mode set comprises at least one drive mode, and wherein the preset drive mode set comprises a non-autonomous drive mode, a driver-aided drive mode, a partially autonomous drive mode, a conditionally autonomous drive mode, a highly autonomous drive mode, and a fully autonomous drive mode; and
        control the vehicle to use the target drive mode for driving when the preset drive mode set comprises the target drive mode.

19. The management device of claim 18, wherein the non-autonomous drive mode is a zeroth-level drive mode, and wherein the fully autonomous drive mode is a fifth-level drive mode.

20. The management device of claim 19, wherein a priority of the fifth-level drive mode is higher than a priority of the zeroth-level drive mode.

* * * * *